United States Patent
Narula et al.

(10) Patent No.: US 8,239,374 B2
(45) Date of Patent: Aug. 7, 2012

(54) COLLECTION OF PERFORMANCE INFORMATION FOR SEARCH QUERIES EXECUTED IN A TIERED ARCHITECTURE

(75) Inventors: Puneet Narula, Bothell, WA (US); Harneet Sidhana, Seattle, WA (US); Risham Mankotia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 12/689,092

(22) Filed: Jan. 18, 2010

(65) Prior Publication Data
US 2011/0179016 A1    Jul. 21, 2011

(51) Int. Cl.
G06F 17/30 (2006.01)
(52) U.S. Cl. .......... 707/719; 707/634; 707/725
(58) Field of Classification Search .......... None
See application file for complete search history.

(56) References Cited

U.S. PATENT DOCUMENTS

| | | | |
|---|---|---|---|
| 6,473,504 B2 | 10/2002 | Rojas | |
| 6,526,524 B1 | 2/2003 | Kelley | |
| 6,578,077 B1 * | 6/2003 | Rakoshitz et al. | 709/224 |
| 6,941,294 B2 | 9/2005 | Flank | |
| 7,516,124 B2 | 4/2009 | Kasperski | |
| 7,836,041 B1 * | 11/2010 | Jain et al. | 707/706 |
| 2004/0143596 A1 | 7/2004 | Sirkin | |
| 2005/0028171 A1 | 2/2005 | Kougiouris | |
| 2006/0017967 A1 | 1/2006 | Asami | |
| 2007/0162422 A1 | 7/2007 | Djabarov | |
| 2008/0177717 A1 | 7/2008 | Kumar | |
| 2009/0077037 A1 | 3/2009 | Wu | |
| 2009/0089296 A1 | 4/2009 | Stemeseder | |
| 2011/0087966 A1 * | 4/2011 | Leviathan | 715/745 |

OTHER PUBLICATIONS

Kreger, Heather; Web Services Conceptual Architecture (WSCA 1.0), IBM Software Group, Copyright © 2001, 41 pages.
Davison et al.; Finding Relevant Website Queries, published: Jun. 16, 2003, 3 pages.

* cited by examiner

*Primary Examiner* — Hung Q Pham
(74) *Attorney, Agent, or Firm* — Merchant & Gould, P.C.

(57) ABSTRACT

An execute request is sent to a search component. The execute request specifies a search query. Subsequently, an execute response is received from the search component. The execute response comprising latency data and one or more properties of query results. The latency data specifies an amount of time consumed by the search component to process the execute request. The query results are content items that satisfy the search query. A record object model latency request is sent to the search component. The record object model latency request specifies search performance information based on the latency data. A record interface latency request is sent to the search component. The record interface latency request specifies interface performance information based on an amount of time consumed by the first component to process the search request.

19 Claims, 4 Drawing Sheets

COLLECTION OF PERFORMANCE INFORMATION FOR SEARCH QUERIES EXECUTED IN A TIERED ARCHITECTURE

BACKGROUND

People are generating an ever-increasing number of documents. As the number of documents grows, it has become increasing difficult for people to find a relevant document amid the plethora of available documents. Consequently, search systems that identify relevant documents have been increasingly important. However, it is insufficient for a search system to merely identify relevant documents: the search system should identify relevant documents in a timely manner. To improve the efficiency of a search system, the search system needs to collect information regarding the performance of the search system.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

In one aspect, a method of collecting performance information for search queries comprises receiving, by a first component, a search request. The search request specifies a search query. The first component is provided by a first computing system. The method also comprises after receiving the search request, sending, by the first component, an execute request to a second component. The execute request is a web services request to invoke an execute method of a web Application Programming Interface (API) provided by the second component. The execute request specifies the search query. In addition, the method comprises after sending the execute request, receiving, by the first component, an execute response from the second component. The execute response is a web services response that is responsive to the execute request. The execute response comprises latency data and data regarding query results. The latency data specifies an amount of time consumed by the second component to process the execute request. The query results are content items that satisfy the search query. The method also comprises, after receiving the execute response, generating, by the first component, user interface data. The user interface data represents a user interface element having contents that depend on the query results. In addition, the method comprises sending, by the first component, a record object model latency request to the second component. The record object model latency request is a web services request to invoke a record object model latency method of the web API. The record object model latency request specifies search performance information based on the latency data. The method also comprises sending, by the first component, a record interface latency request to the second component. The record interface latency request is a web services request to invoke a record interface latency method of the web API. The record interface latency request specifies interface performance information based on an amount of time consumed by the first component to process the search request.

In another aspect, a computing device comprises a processing system and a data storage system storing software instructions that, when executed by the processing system, cause the computing device to receive an execute request from a front end component. The execute request is a web services request to invoke an execute method of a web API provided by the computing device. The execute request specifies a search query. After receiving the execute request, the software instructions cause the computing device to send an execute response to the front end component. The execute response is a web services response that is responsive to the execute request. The execute response comprises latency data and one or more properties of query results. The latency data specifies an amount of time consumed by the computing device to process the execute request. The query results are content items that satisfy the search query. The software instructions also cause the computing device to receive a record object model latency request from the front end component. The record object model latency request is a web services request to invoke a record object model latency method of the web API. The record object model latency request specifies search performance information based on the latency data. The software instructions also cause the computing device to receive a record interface latency request from the front end component. The record interface latency request is a web services request to invoke a record interface latency method of the web API. The record interface latency request specifies interface performance information based on an amount of time consumed by the front end component to process a search request that specifies the search query.

In yet another aspect, a computer-readable data storage medium comprises software instructions that, when executed, cause a computing device to provide a collection of one or more websites to client computing systems. The software instructions, when executed, also cause the computing device to receive a search request through a web page in one of the websites. The search request specifies a search query. After receiving the search request, the software instructions, when executed, cause the computing device to send an execute request to a search component provided by another computing device. The execute request is a web services request to invoke an execute method of a web API provided by the search component. The execute request specifies the search query. The software instructions, when executed, also cause the computing device to send a query suggestions request to the search component. The query suggestions request is a web services request to invoke a query suggestions method of the web API. The query suggestions request specifies one or more properties describing the search query. The software instructions, when executed, also cause the computing device to receive a query suggestions response from the search component. The query suggestions response is a web services response that is responsive to the query suggestions request. The query suggestions response specifies a set of one or more query suggestions. Each query suggestion in the set of query suggestions is a search query related to the search query. After sending the execute request, the software instructions, when executed, cause the computing device to receive an execute response from the search component. The execute response is a web services response that is responsive to the execute request. The execute response comprises latency data and one or more properties of query results. The latency data specifies an amount of time consumed by the search component to process the execute request, an amount of time consumed by intermediate processing of the search query at the search component and an amount of time consumed to execute database operations for retrieving the query results. The query results are content items that satisfy the search query. After receiving the execute response, the software instructions, when executed, cause the computing device to generate a search results page containing at least one of the properties of a given content item. The given content item is one of the query results. The software instructions, when executed, also cause the computing device to send a record object model latency request to the search component. The record object model latency request is a web services request to invoke a record object model latency method of the web API. The record object model latency request specifies search performance information based on the latency data and based on latency data specified in execute responses for other search requests received within a given time period. The software instructions, when executed, also cause the computing device to receive a record object model latency response from the search component. The record object model latency response is a web services response that is responsive to the record object model latency request. The record object model latency response specifies whether verbose query monitoring is turned on at the search component. The software instructions, when executed, also cause the computing device to send a record interface latency request to the search component. The record interface latency request is a web services request to invoke a record interface latency method of the web API. The record interface latency request specifies interface performance information based on amounts of time consumed by the computing device to process the search request and other search requests received in the given time period. The software instructions, when executed, also cause the computing device to receive a record interface latency response from the search component. The record interface latency response is a web services response that is responsive to the record interface latency request. The record interface latency response specifies whether verbose query monitoring is turned on at the search component.

DETAILED DESCRIPTION

Figure 1:
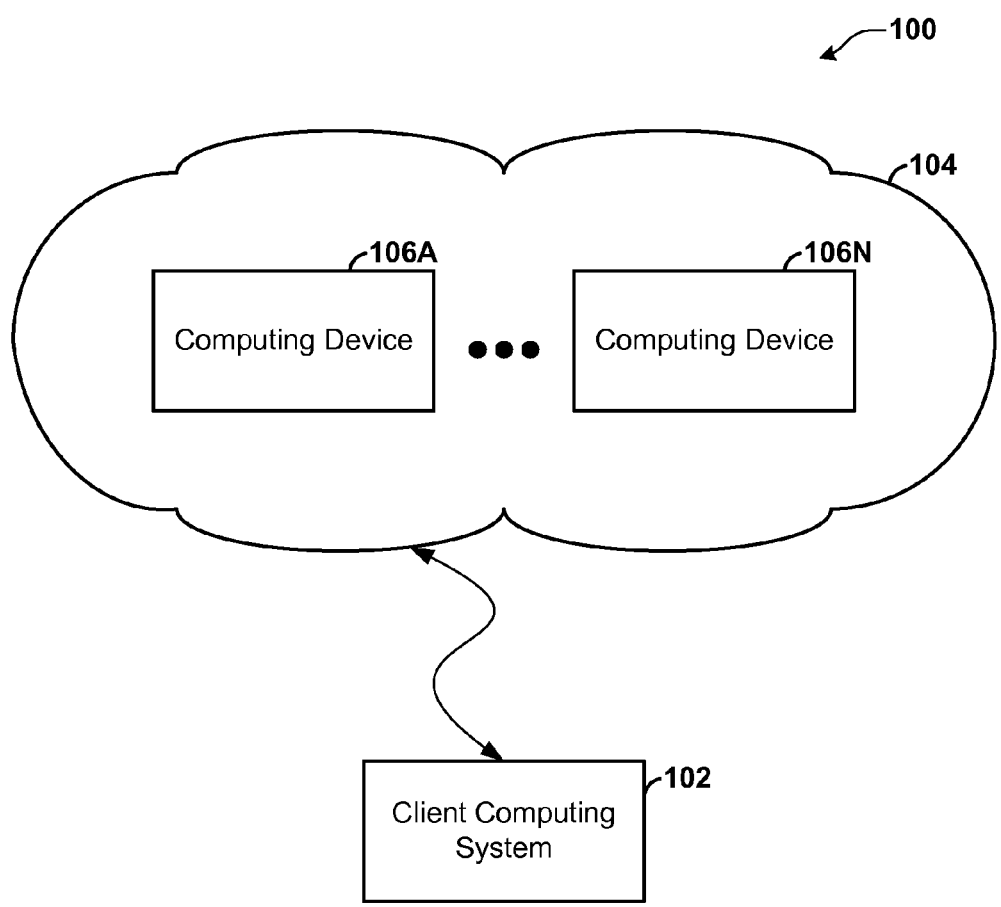
FIG. 1 is a block diagram illustrating an example system.

FIG. 1 is a block diagram illustrating an example system 100. The system 100 is merely one embodiment. Other embodiments include more or fewer computing devices, computing systems, networks, and/or other components.

The system 100 includes a client computing system 102. As used herein, a computing system is a system comprising one or more computing devices. A computing device is a physical device that computes information. In various embodiments, the client computing system 102 can comprise various types of computing devices. For example, the client computing system 102 can comprise a desktop computer, a laptop computer, a handheld computer, a mobile telephone, a television set top box, a computing device integrated into a vehicle, a game console, a standalone server device, a server blade device, a mainframe computing device, or another type of computing device.

Furthermore, the system 100 includes a network 104. The network 104 is a collection of computing devices and links that facilitate communication among the computing devices. The client computing system 102 is able to communicate with at least some of the computing devices in the network 104. In various embodiments, the network 104 includes various types of computing devices. For example, the network 104 can include routers, switches, mobile access points, bridges, hubs, intrusion detection devices, storage devices, standalone server devices, blade server devices, sensors, desktop computers, laptop computers, handheld computers, mobile telephones, and other types of computing devices. In various embodiments, the network 104 includes various types of links For example, the network 104 can include wired and/or wireless links Furthermore, in various embodiments, the network 104 is implemented at various scales. For example, the network 104 can be implemented as one or more local area networks (LANs), metropolitan area networks, subnets, wide area networks (such as the Internet), or can be implemented at another scale.

The network 104 includes computing devices 106A-106N (collectively, "computing devices 106"). In various embodiments, the computing devices 106 can be one or more types of computing devices. For example, one or more of the computing devices 106 can be standalone server devices, blade server devices, personal computers, mainframe computers, and/or other types of computing devices. In some embodiments, the computing devices 106 are operated by a single entity, such as a corporation. In other embodiments, the computing devices 106 are operated by multiple entities. Furthermore, in some embodiments, the computing devices 106 are physically co-located. For example, in some embodiments, the computing devices 106 are physically located at a server farm or a data center. In other embodiments, at least some of the computing devices 106 are geographically dispersed.

The computing devices 106 operate to provide a set of components. As used herein, a component is a functional element of a system. In various embodiments, the computing devices 106 operate to provide various components. For example, in the embodiment illustrated in the example FIG. 2, the set of components includes a data source component 202, a search component 204, and a front end component 206. In other embodiments, the computing devices 106 operate to provide components other than those illustrated in the example of FIG. 2.

In various embodiments, various ones of the components can be provided by various ones of the computing devices 106. For example, in some embodiments, each of the computing devices 106 provides one of the components. In other embodiments, a single one of the computing devices 106 provides two or more of the components.

Furthermore, in various embodiments, the computing devices 106 operate in various ways to provide the components. For example, in some embodiments, the computing devices 106 comprise a data storage system. The data storage system comprises one or more computer-readable data storage media. As used herein, a computer-readable data storage medium is a device or article of manufacture that stores data. The data storage system stores software instructions that, when executed by processing systems in the computing devices 106, cause the computing devices 106 to provide the components. In other embodiments, one or more of the computing devices 106 comprise application-specific integrated circuits (ASICs) that cause the computing devices 106 to provide the components.

The components form a tiered architecture. A first tier includes one or more front end components. A second tier includes one or more search components. A third tier includes one or more data source components. Each of the data source components maintains one or more databases containing content items. The search components interact with the data source components to generate indexes over the content items in the databases. Client computing systems, such as the client computing system 102, send search requests to the front end components. The search requests specify search queries. In response to the search requests, the front end components use web services requests to instruct the search components to execute the search queries.

In response to the web services requests, the search components use the indexes to identify query results. The query results are content items that are in the databases and that satisfy the search queries. The search components can then interact with the data source components to retrieve data regarding the query results. For example, the search components can interact with the data source components to retrieve one or more properties of query results. The search components send web services responses back to the front end components. The web services responses contain data regarding the query results. For example, the web services responses can contain Uniform Resource Identifier (URIs) of the query results.

The front end components use the data in the web services responses to generate user interface data. The user interface data represent user interface elements having contents that are dependent on the query results. For example, a front end component can generate user interface data that represents a user interface element that contains one or more properties of the query results. In another example, a front end component can generate user interface data that represents a user interface element that indicates how many content items satisfy the search queries. The front end components then send the user interface data to the client computing systems. As used herein, a user interface elements is a portion of a user interface or a complete user interface.

In addition to including data regarding the query results, the web services responses contain latency data. The latency data indicate amounts of time consumed by the search components to execute the search queries. In some embodiments, the web services responses also include additional timing information. The additional timing information can include information about how much time was consumed to perform database operations during execution of the search queries and information about how much time was consumed performing intermediate operations during execution of the search queries. The front end components collect the latency data. The front end components periodically send additional web services requests to the search components to record search performance information based on the latency data. In embodiments where the web services responses include additional timing information, the additional web services requests are further based on the additional timing information.

The front end components also send web services requests to the search components to record interface performance information. The interface performance information is based on data indicating amounts of time consumed by the front end components to process the search requests. The search performance information and the interface performance information can be used to evaluate and improve the efficiency of search requests.

Figure 2:
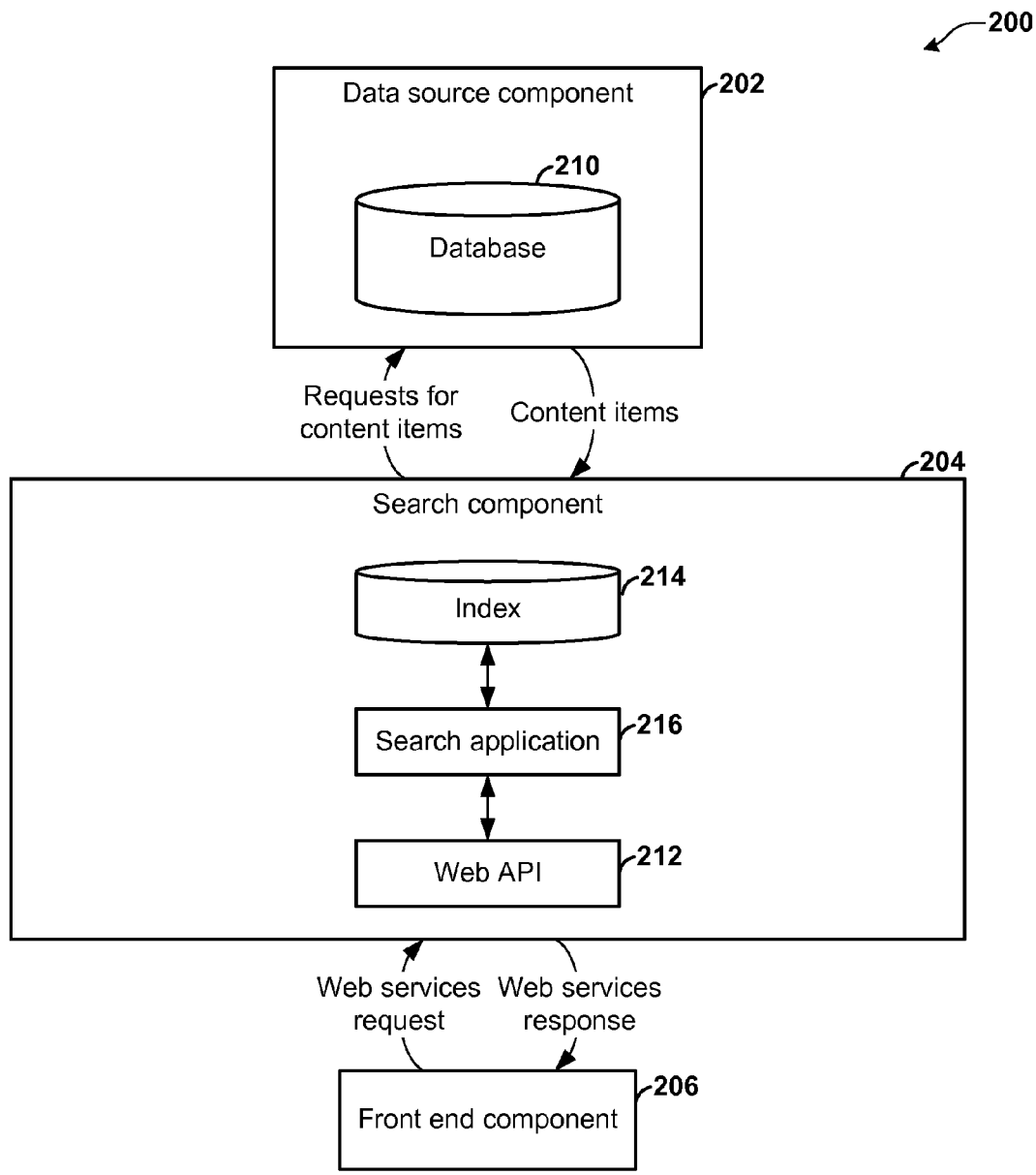
FIG. 2 is a block diagram illustrating an example tiered architecture of components provided by one or more computing devices.

FIG. 2 is a block diagram illustrating an example tiered architecture 200 of components provided by one or more of the computing devices 106. The tiered architecture 200 is merely one embodiment. Other embodiments include more or fewer components.

The tiered architecture 200 includes a data source component 202, a search component 204, and a front end component 206. In various embodiments, the data source component 202, the search component 204, the front end component 206, and the performance evaluation component 208 are provided by various ones of the computing devices 106 illustrated in the example of FIG. 1.

The data source component 202 manages a database 210. The database 210 stores content items. A content item is an individually identifiable set of data. The content items belong to one or more types. For example, in some embodiments, the database 210 stores e-mail messages, task list items, calendar appointments, contacts, customer-relations management data, documents, and/or other types of data. In various embodiments, the database 210 is implemented in various ways. For example, in some embodiments, the database 210 is implemented as a general-purpose relational database. In other embodiments, the database 210 is implemented as an Online Analytics Processing (OLAP) cube. In other embodiments, the data source component 202 maintains a plurality of databases that contain content items.

Furthermore, the data source component 202 provides a set of services that enable storage and retrieval of content items in the database 210. In various embodiments, the data source component 202 provides various services. For example, in some embodiments, the data source component 202 provides an e-mail service. The e-mail service listens for incoming e-mail messages and stores the incoming e-mail messages into the database 210. In this example, the e-mail service also processes requests from client applications to retrieve e-mail messages stored in the database 210. In another example, the data source component 202 provides a document management service. The document management service stores documents in the database 210 and allows components, such as the search component 204, to check out and check in the documents. In yet another example, the data source component 202 is a FAST™ data source provided by MICROSOFT® Corporation.

The search component 204 provides a web Application Programming Interface (API) 212. A web API is an API that is accessible over a network and is executed on a computing system that hosts services. The web API 212 includes a set of methods. In various embodiments, the web API 212 includes various methods. For example, in some embodiments, the web API 212 includes a get search service application information method, a record query error event method, a get properties method, a highlight string value method, an execute method, a get top query strings for URL method, a record user interface (UI) query done event method, a get scopes method, a record object model (OM) query done event method, a record click method, a query suggestions method, a get click frequencies method, and a get search terms method. These methods and others are described herein. In other embodiments, the web API 212 includes more or fewer methods.

The search component 204 also includes an index 214. The index 214 comprises a set of entries. Each entry maps a term to one or more content items to which the term is applicable. In other words, the index 214 is an inverted index. For example, an entry in the index 214 can map the term "blizzard" to content items that contain the term "blizzard." In another example, an entry in the index 214 can map the term "2009" to content items created in the year 2009. In this other example, the content items created in the year 2009 do not necessarily include the term "2009." In some embodiments, the search component 204 stores the index 214 in a file system.

In addition, the search component 204 includes a search application 216. The search application 216 generates the index 214. To generate the index 214, the search application 216 communicates with the data source component 202 to retrieve content items stored in the database 210. When the search application 216 retrieves a content item, the search application 216 identifies terms that are applicable to the content item. In various embodiments, the search application 216 identifies terms that are applicable to the content item in various ways. For example, the search application 216 can identify each term contained in the content item and/or use metadata retrieved with the content item to identify terms applicable to the content item. The search application 216 then updates the index 214 such that the index 214 contains entries that map the identified terms to the content item.

The search application 216 also receives requests from the web API 212 to process search queries. To process a search query, the search application 216 identifies entries in the index 214 that are associated with terms in the search query. The set of query results for the search query is the intersection set of the content items identified by the identified entries. For example, the search query can include the terms "Jones," "Middle," and "School." In this example, one entry in the index 214 maps the term "Jones" to content items A, B, and C, another entry in the index 214 maps the term "Middle" to content items B, C, and D, and yet another entry in the index 214 maps the term "School" to content items B, C, and E. In this example, the content items B and C are the query results for the search query.

After identifying the query results for the search query, the search application 216 sorts the query results. In various embodiments, the search application 216 sorts the query results in various ways. For example, in some embodiments, the search application 216 sorts the query results based on relevance to the search query. In other embodiments, the search application 216 sorts the query results based on date of creation. After sorting the query results, the search application 216 returns the sorted query results to the web API 212.

The front end component 206 provides a collection of one or more websites to client computing systems, such as the client computing system 102. A website is a collection of network-accessible resources. The network-accessible resources can include web pages, scripts, AJAX resources, documents, and other types of resources. A client computing system accesses a resource in the collection of websites by sending requests for the resources to the front end component. When the front end component 206 receives a request for a resource from a client computing system, the front end component 206 processes the request and provides a response to the client computing system.

The front end component 206 processes requests for different resources in different ways. For example, the front end component 206 can receive a request for a static web page. In this example, the front end component 206 retrieves an HTML document representing the static web page and sends a response containing the HTML document. In another example, the front end component 206 receives a request for a dynamically-generated web page. In this example, the front end component 206 processes a script or other set of instructions to generate the web page. As part of processing the script, the front end component 206 can send a web services request to the web API 212 and receive a web services response from the web API 212. A web services request is a message instructing a computing system to remotely invoke a method of a web-accessible API. A web services response is a message containing data representing the results of invoking a method of a web-accessible API.

The front end component 206 receives search requests from client computing systems through web pages in the websites provided by the front end component 206. In various embodiments, the web pages receive search requests in various ways. For example, in some embodiments, the web pages include conventional HTML forms that receive search requests. In other embodiments, the web pages include search-related web parts that facilitate receiving search requests. A web part is a reusable component that contains or generates Web-based content such as XML, HTML, and scripting code. A web part has a standard property schema that displays that content in a cohesive unit on a Web page.

The search requests specify one or more search queries. In various embodiments, search requests are formatted in various ways. For example, in some embodiments, a search request is an HTTP request that specifies a search query in a URL of a requested resource. In another example, a search request is an HTTP POST or PUT request that contains a search query. In yet another example, a search request is a SOAP request containing a search query.

When the front end component 206 receives a search request, the front end component 206 sends an execute request to the web API 212. The execute request is a web services request to invoke an execute method of the web API 212. The execute request specifies the search query. When invoked, the execute method of the web API 212 causes the search application 216 to identify query results for the search query and to retrieve or generate data regarding the query results from the data source component 202. The web API 212 then sends an execute response to the front end component 206. The execute response is a web services response that is responsive to the execute request. The execute response contains the data regarding query results for the search query. For example, the execute response can contain one or more properties, such as unique identifiers, of query results for the search query.

In addition to the data regarding the query results, the execute response contains latency data. The latency data specifies the amount of time consumed by the search component 204 to process the execute request. In other words, the latency data specifies the amount of time between the time when the search component 204 received the execute request and the time when the search component 204 sent the corresponding execute response. For example, the execute response can specify that the search component 204 consumed 99 milliseconds to process the execute request.

Furthermore, after the front end component 206 receives the execute response, the front end component 206 sends a record object model (OM) latency request to the web API 212. The record OM latency request is a web services request to invoke a record OM latency method of the web API 212. The record OM latency request includes search performance information based on the latency data specified in the execute response. In various instances, the latency data is aggregated with latency data from one or more other execute responses to form the search performance information. In other instances, the search performance information individually includes the latency data. When the web API 212 receives the record OM latency request, the web API 212 records the search performance information. The record OM latency request includes the term "OM" because the Web API 212 is an object model (i.e., an object-oriented interface to some service or system).

After the front end component 206 receives the execute response, the front end component 206 generates user interface data and sends the user interface data to the client computing system that sent the search request (e.g., the client computing system 102). The user interface data represents a user interface element having contents that depend on the query results. For example, the user interface data can represent a user interface element that contains at least one returned property for at least a given content item. The given content item is one of the query results.

In various embodiments, the user interface data represents various types of user interface elements in various ways. For example, in some embodiments, the user interface data is a HTML document representing a search results page. The search results page can include one or more search-related web parts. In another example, the user interface data is an XML document. In this other example, a client computing system provides the XML document to a search-related web part in a web page through which the search request was submitted. The search-related web part processes the XML document to display data regarding query results on the web page.

In addition, after the front end component 206 sends the user interface data to the client computing system, the front end component 206 sends a record user interface (UI) latency request to the web API 212. The record UI latency request is a web services request to invoke a record UI latency method of the web API 212. The record UI latency request specifies an amount of time consumed by the front end component 206 to process the search request from the client computing system. The amount of time consumed by the front end component 206 to process the search request is the amount of time between the time that the front end component 206 receives the search request from the client computing system and the time that the front end component 206 sends the user interface data to the client computing system. When the web API 212 receives the record UI latency request, the web API 212 records the amount of time consumed by the front end component 206 to process the search request.

In addition, the front end component 206 provides resources that allow users of client computing systems to evaluate the performance of the system 200 in processing search requests. For example, the front end component 206 can provide resources that allow a user to view aggregate or detailed response times for search requests. Furthermore, the front end component 206 provides resources that allow users of client computing systems to evaluate how the system 200 is being used. For example, the front end component 206 provides a resource that allows a user to view frequencies with which particular content items are selected.

Figure 3:
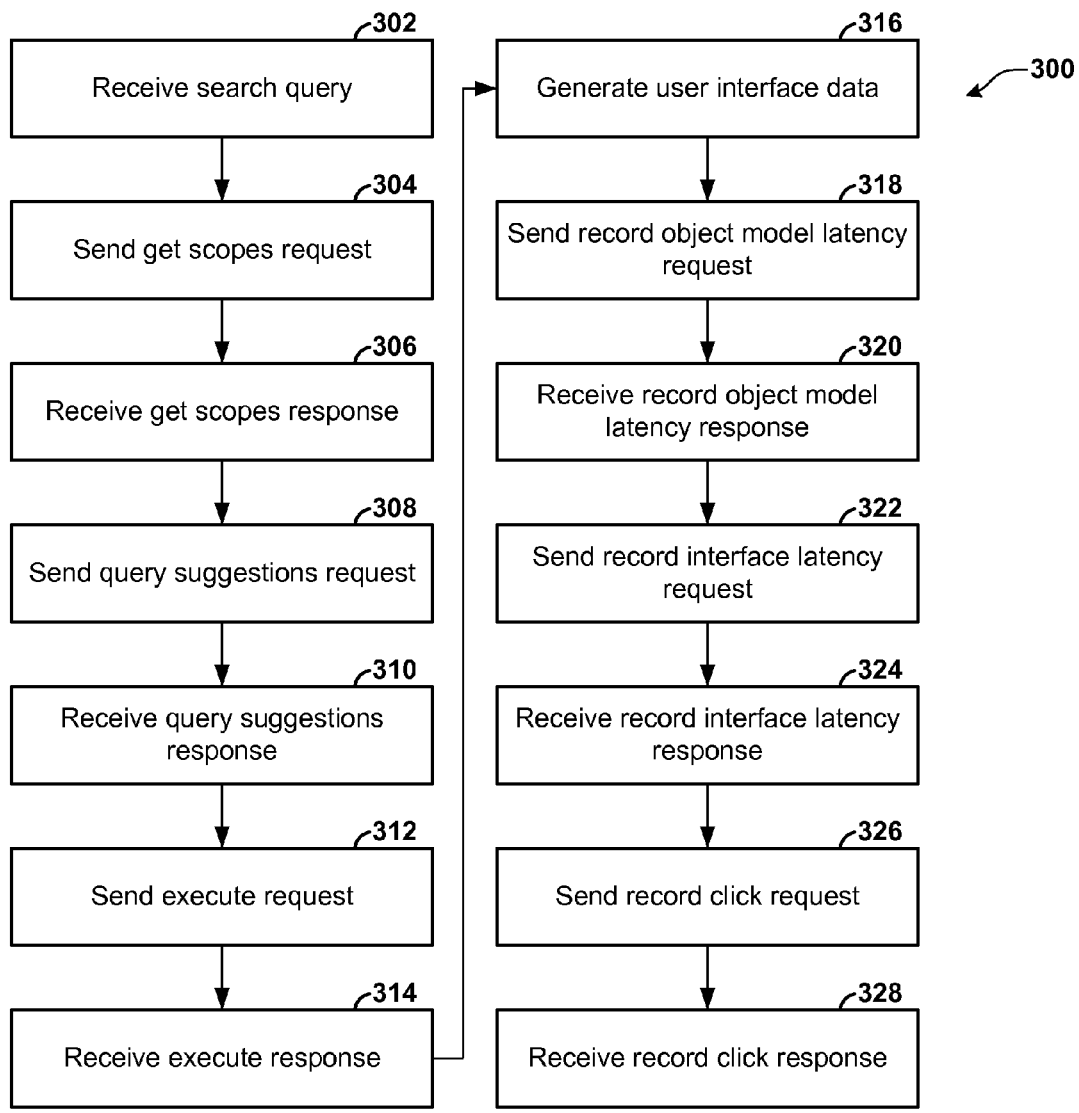
FIG. 3 is a flowchart illustrating an example operation of a front end component to execute a search query and to provide performance information to a search component.

As mentioned above, the web API 212, in some embodiments, includes a get search service application information method, a record query error event method, a get properties method, a highlight string value method, an execute method, a get top query strings for URL method, a record UI query done event method, a get scopes method, a record OM query done event method, a record web part query done event method, a record click method, a query suggestions method, a get click frequencies method, and a get search terms method. The front end component 204 can perform a wide variety of operations using web services requests to invoke these methods of the web API 212. One example operation is illustrated in the example of FIG. 3. Each of these methods of the web API 212 is now discussed in detail.

Get Search Service Application Information

The web API 212 includes a get search service application information method. The search component 204 invokes the get search service application information method when the search component 204 receives a get search service application information request from the front end component 206. The get search service application information request is a web services request to invoke the get search service application information method. The front end component 206 uses the get search service application information request to get information about the search application 216.

In various embodiments, the get search service application information request is formatted in various ways. For example, in some embodiments, the get search service application information request is a SOAP request comprising XML elements. In some embodiments, the XML elements conform to the following schema:

```
<xs:element name="GetSearchServiceApplicationInfo"
  xmlns:xs="http://www.w3.org/2001/XMLSchema">
  <xs:complexType>
    <xs:sequence/>
  </xs:complexType>
</xs:element>
```

When the search component 204 invokes the get search service application information method, the web API 212 generates a get search service application information response. The get search service application information response is a web services response that is responsive to the get search service application information request. The get search service application information response contains properties configured for the search application 216.

In various embodiments, the get search service application information response contains various properties configured for the search application 216. For example, in some embodiments, the get search service application information response includes a query suggestions enabled property, a query logging enabled property, and a property bag property. The query suggestions enabled property specifies whether query suggestions are turned on for the search application 216. The query logging enabled property specifies whether query logging is enabled for the search application 216. The property bag property contains configuration settings applicable when the data source component 202 is a FAST™ data source. The configuration settings include a FASTSearchContextProperties setting, a FASTSearchAdminServiceAuthenticationUser setting, a FASTSearchAdminServiceLocation setting, a FASTSearchResourceStoreLocation setting, a FASTSearchQueryServiceLocations setting, a FASTSearchContextCacheTimeout setting, and a FASTSearchDisableUserContext setting. The FASTSearchContextProperties setting is a comma separated string of user specific properties that the search component 204 uses when allowing a site administrator to define a context to associate with featured content, best bets, promotions and demotions. Featured content is an indexed content item that a site administrator assigns to a keyword to promote that content item in query results. A best bet is a URL that a site collection administrator assigns to a keyword as being relevant for the keyword. The FASTSearchAdminServiceAuthenticationUser setting is a user name that the search component 204 uses for authentication and authorization of operations on the site administration and central administration services. The FASTSearchAdminServiceLocation setting is a host name and port number which the search component 204 uses to access the FAST™ data source for SHAREPOINT® administrative services, except the resource store service. The FASTSearchResourceStoreLocation is a host name and port number that the search component 204 uses to access the FAST™ data source for the SHAREPOINT® resource store service. The FASTSearchQueryServiceLocations setting is a location of one or more query services the search component 204 accesses to get query results. The FASTSearchContextCacheTimeout setting is a timeout period the front end component 206 uses to cache values read in the FASTSearchContextProperties setting. The FASTSearchDisableUserContext setting indicates whether the front end component 206 submits values for the FASTSearchContextProperties setting in UserContextData when querying.

In various embodiments, the get search service application information response is formatted in various ways. For example, in some embodiments, the get search service application information response is formatted as a SOAP response comprising XML elements. In some embodiments, the XML elements conform to the following schema:

```
<xs:element name="GetSearchServiceApplicationInfoResponse"
xmlns:xs="http://www.w3.org/2001/XMLSchema">
    <xs:complexType>
        <xs:sequence>
            <xs:element minOccurs="0"
name="GetSearchServiceApplicationInfoResult" nillable="true"
xmlns:q17="http://www.microsoft.com/sharepoint/search/KnownTypes/
2008/08" type="q17:SearchServiceApplicationInfo"/>
        </xs:sequence>
    </xs:complexType>
</xs:element>
```

In this example, the "GetSearchServiceApplicationInfoResult" element belongs to the "SearchServiceApplicationInfo" type. Elements belonging to the "SearchServiceApplicationInfo" type conform to the following schema:

```
<xs:complexType name="SearchServiceApplicationInfo"
xmlns:xs="http://www.w3.org/2001/XMLSchema">
    <xs:sequence>
        <xs:element minOccurs="0" name="PropertyBag" nillable="true"
xmlns:q27="http://schemas.microsoft.com/2003/10/Serialization/Arrays"
type="q27:ArrayOfKeyValueOfstringstring"/>
        <xs:element minOccurs="0" name="QueryLoggingEnabled"
type="xs:boolean"/>
        <xs:element minOccurs="0" name="QuerySuggestionsEnabled"
type="xs:boolean"/>
    </xs:sequence>
</xs:complexType>
```

In this example, the "PropertyBag" element specifies the property bag property, the "QueryLoggingEnabled" element specifies the query logging enabled property, and the "QuerySuggestionsEnabled" element specifies the query suggestions enabled property.

Record Query Error Event

The web API 212 also includes a record query error event method. The search component 204 invokes the record query error event method when the search component 204 receives a record query error event request. The record query error event is a web services request to invoke the record query error method. The front end component 206 uses the record query error event request to inform the search component 204 of errors that occurred during the processing of search queries in the front end component 206 within a given time period. In various embodiments, the record query error event request specifies information regarding errors occurring within time periods having various lengths. For example, in some embodiments, the record query error event request specifies information regarding errors occurring within a sixty second time period. In other embodiments, the record request error event request specifies information regarding errors occurring within a thirty second time period.

In various embodiments, the record query error event request is formatted in various ways. For example, in some embodiments, the record query error event request is formatted as a SOAP request comprising XML elements. The XML elements conform to the following schema:

```
<xs:element name="RecordQueryErrorEvent"
xmlns:xs="http://www.w3.org/2001/XMLSchema">
    <xs:complexType>
        <xs:sequence>
            <xs:element minOccurs="0" name="buffer" nillable="true"
xmlns:q21="http://www.microsoft.com/sharepoint/search/KnownTypes/
2008/08" type="q21:QueryErrorDataBuffer"/>
        </xs:sequence>
    </xs:complexType>
</xs:element>
```

In this example, the "RecordQueryErrorEvent" element represents the record query error event request. The "RecordQueryErrorEvent" element contains a "buffer" element. The "buffer" element specifies a list of information for errors that occurred during the processing of search queries executed within the given time period in the front end component 206.

The "buffer" element belongs to the "QueryErrorDataBuffer" type. Elements belonging to the "QueryErrorDataBuffer" type conform to the following schema:

```
<xs:complexType name="QueryErrorDataBuffer"
xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="VerboseQueryTimings"
nillable="true" type="tns:ArrayOfVerboseQueryErrorDataBuffer"/>
            </xs:sequence>
        </xs:extension>
    </xs:complexContent>
</xs:complexType>
```

In this example, the "QueryErrorDataBuffer" type extends the "DataBuffer" type. Elements conforming to the "DataBuffer" type conform to the following schema:

```
<xs:complexType name="DataBuffer"
xmlns:xs="http://www.w3.org/2001/XMLSchema">
    <xs:sequence>
        <xs:element minOccurs="0" name="ApplicationId" type=
"ser:guid"/>
        <xs:element minOccurs="0" name="EventTime" type=
"xs:dateTime"/>
        <xs:element minOccurs="0" name="MachineName" nillable="true"
type="xs:string"/>
    </xs:sequence>
</xs:complexType>
```

In this example, elements belonging to the "DataBuffer" type are allowed to include an "ApplicationId" element, an "EventTime" element, and a "MachineName" element. The "ApplicationId" element specifies a unique identifier of the search application 216. The "EventTime" element specifies a date and time at which an event occurred. The "MachineName" element specifies a name of a computer where the event occurred.

Elements conforming to the "QueryErrorDataBuffer" type include a "VerboseQueryTimings" element. The "VerboseQueryTimings" element specifies a list of information for errors that occurred during processing of search queries at the front end component 206 within the given time period.

The "VerboseQueryTimings" element belongs to the "ArrayOfVerboseQueryErrorDataBuffer" type. Elements belonging to the "ArrayOfVerboseQueryErrorDataBuffer" type conform to the following schema:

```
<xs:complexType name="ArrayOfVerboseQueryErrorDataBuffer"
xmlns:xs="http://www.w3.org/2001/XMLSchema">
    <xs:sequence>
        <xs:element minOccurs="0" maxOccurs="unbounded"
name="VerboseQueryErrorDataBuffer" nillable="true"
type="tns:VerboseQueryErrorDataBuffer"/>
    </xs:sequence>
</xs:complexType>
```

In this example, elements conforming to the "ArrayOfVerboseQueryErrorDataBuffer" type include one or more "VerboseQueryErrorDataBuffer" elements. Each of the "VerboseQueryErrorDataBuffer" elements specifies information regarding an error that occurred during processing of a search query at the front end component 204 during the given time period.

The "VerboseQueryErrorDataBuffer" elements belong to the "VerboseQueryErrorDataBuffer" type. Elements belonging to the "VerboseQueryErrorDataBuffer" type conform to the following XML schema:

```
<xs:complexType name="VerboseQueryErrorDataBuffer"
xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="CorrelationId" type=
"ser:guid"/>
                <xs:element minOccurs="0" name="Exception" nillable=
"true"
type="xs:string"/>
                <xs:element minOccurs="0" name="Operation" nillable=
"true"
type="xs:string"/>
            </xs:sequence>
        </xs:extension>
    </xs:complexContent>
</xs:complexType>
```

In this example, the "VerboseQueryErrorDataBuffer" type extends the "DataBuffer" type. In addition, elements conforming to the "VerboseQueryErrorDataBuffer" type are allowed to include a "CorrelationId" element, an "Exception" element, and an "Operation" element. The "CorrelationId" element specifies a unique identifier of a search query specified in the "CorrelationId" element of the "Properties" element of an execute request for the search query. The "Exception" element specifies details of an exception if any occurred on the front end component 206 during processing of the search query. The "Operation" element specifies details of an operation that caused an exception to occur during processing of the search query.

When the search component 204 invokes the record query error event method in response to receiving a record query error event request, the web API 212 generates a record query error event response. The record query error event response is a web services response that is responsive to the record query error event request. The record query error event response indicates whether verbose query monitoring is turned on for the search application 216. When verbose query monitoring is turned on the search application 216, the search application 216 stores more performance information regarding search queries than when verbose query monitoring is turned off on the search application 216.

In various embodiments, the record query error event response is formatted in various ways. For example, in some embodiments, the record query error event response is formatted as a SOAP response comprising XML elements. The XML elements conform to the following schema:

```
<xs:element name="RecordQueryErrorEventResponse"
xmlns:xs="http://www.w3.org/2001/XMLSchema">
    <xs:complexType>
        <xs:sequence>
            <xs:element minOccurs="0" name=
"RecordQueryErrorEventResult"
type="xs:boolean"/>
        </xs:sequence>
    </xs:complexType>
</xs:element>
```

In this example, the "RecordQueryErrorEventResponse" element represents the record query error event response. The "RecordQueryErrorEventResponse" element contains a "RecordQueryErrorEventResult" element that indicates whether verbose query monitoring for the search application 216 is turned on.

Get Properties

The web API 212 also includes a get properties method. The search component 204 invokes the get properties method when the search component 204 receives a get properties request. The get properties request is a web services request to invoke the get properties method. The front end component 206 uses the get properties request to retrieve information about managed properties of the search application 216. A managed property is a specific property that is part of a metadata schema. A managed property can be exposed for use in search queries. The managed properties of the search application 216 are properties of content items that can be returned in search queries sent to the search application 216.

In various embodiments, the search application 216 has various managed properties. For example, a default set of managed properties includes: workId, rank, title, author, size, path, description, write, site name, collapsing status, hit highlighted summary, hit highlighted properties, content class, picture thumbnail URL, and isDocument. In this example, the hit highlighted summary is a string containing a set of excerpts from a content item that is relevant to a search query.

In various embodiments, the get properties request is formatted in various ways. For example, in some embodiments, the get properties request is formatted as a SOAP request comprising XML elements. The XML elements conform to the following schema:

```
<xs:element name="GetProperties"
xmlns:xs="http://www.w3.org/2001/XMLSchema">
    <xs:complexType>
        <xs:sequence>
            <xs:element minOccurs="0" name="properties" nillable="true"
xmlns:q6="http://www.microsoft.com/sharepoint/search/KnownTypes/
2008/08" type="q6:QueryProperties"/>
        </xs:sequence>
    </xs:complexType>
</xs:element>
```

In this example, the "GetProperties" element represents the get properties request. The "GetProperties" element includes a "properties" element. The "properties" element specifies properties related to a search query. The "properties" element belongs to a "KeywordQueryProperties" type or a "FullTextSqlQueryProperties" type. The "KeywordQueryProperties" type and the "FullTextSqlQueryProperties" type extend a "QueryProperties" type. The "KeywordQueryProperties" type, the "FullTextSqlQueryProperties" type, and the "QueryProperties" type are described elsewhere in this document. The web API 212 ignores the "properties" element in the get properties request.

When the search component 204 invokes the get properties method in response to receiving a get properties request, the web API 212 generates a get properties response. The get properties response is a web services response that is responsive to the get properties request. The get properties response contains information about managed properties of the search application 216.

In various embodiments, the get properties response is formatted in various ways. For example, in some embodiments, the get properties response is formatted as a SOAP response comprising XML elements. The XML elements conform to the following schema:

```
<xs:element name="GetPropertiesResponse"
xmlns:xs="http://www.w3.org/2001/XMLSchema">
  <xs:complexType>
    <xs:sequence>
      <xs:element minOccurs="0" name="GetPropertiesResult" nillable=
"true" xmlns:q7="http://www.microsoft.com/sharepoint/search/
KnownTypes/2008/08" type="q7:ArrayOfPropertyInformation"/>
    </xs:sequence>
  </xs:complexType>
</xs:element>
```

In this example, the "GetPropertiesResponse" element represents the get properties response. The "GetPropertiesResponse" element contains a "GetPropertiesResult" element. The "GetPropertiesResult" element contains information about managed properties of the search application 216.

The "GetPropertiesResult" element belongs to the "ArrayOfPropertyInformation" type. Elements belonging to the "ArrayOfPropertyInformation" type conform to the following schema:

```
<xs:complexType name="ArrayOfPropertyInformation"
xmlns:xs="http://www.w3.org/2001/XMLSchema">
  <xs:sequence>
    <xs:element minOccurs="0" maxOccurs="unbounded"
name="PropertyInformation" nillable="true" type=
"tns:PropertyInformation"/>
  </xs:sequence>
</xs:complexType>
```

In this example, elements belonging to the "ArrayOfPropertyInformation" type include a sequence of "PropertyInformation" elements. Each of the "PropertyInformation" elements contains information about a single managed property of the search application 216.

The "PropertyInformation" elements belong to a "PropertyInformation" type. Elements belonging to the "PropertyInformation" type conform to the following schema:

```
<xs:complexType name="PropertyInformation"
xmlns:xs="http://www.w3.org/2001/XMLSchema">
```

-continued

```
  <xs:sequence>
    <xs:element minOccurs="0" name="Description" nillable="true"
type="xs:string"/>
    <xs:element minOccurs="0" name="FullTextQueriable" type=
"xs:boolean"/>
    <xs:element minOccurs="0" name="Name" nillable="true"
type="xs:string"/>
    <xs:element minOccurs="0" name="Retrievable" type=
"xs:boolean"/>
    <xs:element minOccurs="0" name="m_TypeFullName" nillable=
"true"
type="xs:string"/>
  </xs:sequence>
</xs:complexType>
```

In this example, elements belonging to the "PropertyInformation" type are allowed to include a "Description" element, a "FullTextQueriable" element, a "Name" element, a "Retrievable" element, and a "m_TypeFullName" element. The "Description" element specifies a description of a managed property. The "FullTextQueriable" element specifies if the managed property is a full-text searchable managed property. The "Name" property specifies a name of the managed property. The "Retrievable" property specifies whether the managed property is a retrievable managed property. The "m_TypeFullName" property specifies a type of the managed property. The "m_TypeFullName" property is allowed to specify one of the following types: System.String, System.Int64, System.Double, System.DateTime, System.Boolean, and System.Byte[ ].

Highlight String Value

The web API 212 also includes a highlight string value method. The search component 204 invokes the highlight string value method when the search component 204 receives a highlight string value request. The highlight string value request is a web services request to invoke a highlight string value method. The front end component 206 uses the highlight string value request to highlight each occurrence of specified query terms in a specified string value. In various embodiments, the specified query terms can be highlighted in various ways. For example, in some embodiments, the specified query terms can be highlighted by enclosing the specified query terms in an open and close <b> tag to make the specified query terms bold.

In various embodiments, the highlight string value request is formatted in various ways. For example, in some embodiments, the highlight string value request is formatted as a SOAP request comprising XML elements. The XML elements conform to the following schema:

```
<xs:element name="HighlightStringValue"
xmlns:xs="http://www.w3.org/2001/XMLSchema">
  <xs:complexType>
    <xs:sequence>
      <xs:element minOccurs="0" name="properties" nillable="true"
xmlns:q12="http://www.microsoft.com/sharepoint/search/KnownTypes/
2008/08" type="q12:QueryProperties"/>
      <xs:element minOccurs="0" name="strValue" nillable="true"
type="xs:string"/>
      <xs:element minOccurs="0" name="fLastTermByPrefix"
type="xs:boolean"/>
    </xs:sequence>
  </xs:complexType>
</xs:element>
```

In this example, the "HighlightStringValue" element represents the highlight string value request. The "HighlightStringValue" element contains a "properties" element, a "str- Value" element, and a "fLastTermByPrefix" element. The "properties" element contains query properties. The query properties include a QueryText element that contains query terms. The "properties" element belongs to the "KeywordQueryProperties" type or the "FullTextQueryProperties" type. The "KeywordQueryProperties" type and the "FullTextQueryProperties" type extend the "QueryProperties" type. The "KeywordQueryProperties" type, the "FullTextQueryProperties" type, and "QueryProperties" type are described elsewhere in this document. The "strValue" element specifies a string to be highlighted. The "fLastTermByPrefix" element specifies whether a last query token is matched by a prefix. If the value of the "fLastTermByPrefix" element is "true," any token in the "strValue" element that matches the prefix of the last token in the query string is highlighted. If the value of the "fLastTermByPrefix" element is "false," tokens in the "strValue" element are highlighted only if the tokens match the query terms exactly.

When the search component 204 invokes the highlight string value method in response to receiving a highlight string value request, the web API 212 generates a highlight string value response. The highlight string value response is a web services response that is responsive to the highlight string value request. The highlight string value response contains the string specified in the highlight string value request, but with the query terms highlighted. In some embodiments, the search component 204 uses one or more word breaker systems to identify the query terms and the tokens in the specified string.

In various embodiments, the highlight string value response is formatted in various ways. For example, in some embodiments, the highlight string value response is formatted as a SOAP response comprising XML elements. The XML elements conform to the following schema:

```
<xs:element name="HighlightStringValueResponse"
xmlns:xs="http://www.w3.org/2001/XMLSchema">
  <xs:complexType>
    <xs:sequence>
      <xs:element minOccurs="0" name="HighlightStringValueResult"
nillable="true"
xmlns:q13="http://www.microsoft.com/sharepoint/search/KnownTypes/
2008/08" type="q13:HighlightedString"/>
    </xs:sequence>
  </xs:complexType>
</xs:element>
```

In this example, the "HighlightStringValueResponse" element represents the highlight string value response. The "HighlightStringValueResponse" element includes a "HighlightStringValueResult" element. The "HighlightStringValueResult" element specifies the string in which the query terms are highlighted. The "HighlightStringValueResult" element belongs to the "HighlightedString" type. Elements belonging to the "HighlightedString" type conform to the following schema:

```
<xs:complexType name="HighlightedString"
xmlns:xs="http://www.w3.org/2001/XMLSchema">
  <xs:sequence>
    <xs:element minOccurs="0" name="HighlightCount" type="xs:int"/>
    <xs:element minOccurs="0" name="Value" nillable="true"
type="xs:string"/>
  </xs:sequence>
</xs:complexType>
```

In this example, elements belonging to the "HighlightedString" type include a "HighlightCount" element and a "Value" element. The "HighlightCount" element specifies a number of occurrences of the query terms that are highlighted. The "Value" element specifies the string in which each occurrence of the query terms is highlighted.

Execute

The web API 212 also includes an execute method. The search component 204 invokes the execute method when the search component 204 receives an execute request. The execute request is a web services request to invoke the execute method. The front end component 206 uses the execute method to execute a search query. The execute request specifies the search query as a set of properties. The properties can specify query terms, how to sort the query results, which properties of the query results to return, a search scope, and/or other properties.

In various embodiments, the execute request is formatted in various ways. For example, in some embodiments, the execute request is formatted as a SOAP request comprising XML elements. In some embodiments, the XML elements conform to the following schema:

```
<xs:element name="Execute" xmlns:xs="http://www.w3.org/2001/
XMLSchema">
  <xs:complexType>
    <xs:sequence>
      <xs:element minOccurs="0" name="properties" nillable="true"
xmlns:q4="http://www.microsoft.com/sharepoint/search/KnownTypes/
2008/08" type="q4:QueryProperties"/>
    </xs:sequence>
  </xs:complexType>
</xs:element>
```

In this example, the "Execute" element includes a "properties" element. The "properties" element specifies properties related to the search query.

The "properties" element belongs to a "KeywordQueryProperties" type or a "FullTextSqlQueryProperties" type. The "KeywordQueryProperties" type and the "FullTextSqlQueryProperties" type extend the "QueryProperties" type. When the "properties" element belongs to the "KeywordQueryProperties" type, the "properties" element contains information about a keyword query search query. When the "properties" element belongs to the "FullTextSqlQueryProperties" type, the "properties" element contains information about a full text Structured Query Language (SQL) search query.

Elements belonging to the "QueryProperties" type conform to the following schema:

```
<xs:complexType name="QueryProperties"
xmlns:xs="http://www.w3.org/2001/XMLSchema">
  <xs:sequence>
    <xs:element minOccurs="0" name="AlertInfo" nillable="true"
type="tns:AlertInfo"/>
    <xs:element minOccurs="0" name="AuthenticationType"
```

-continued

```
xmlns:q7="http://schemas.datacontract.org/2004/07/Microsoft.Office.Server.Search.
Query" type="q7:QueryAuthenticationType"/>
    <xs:element minOccurs="0" name="CorrelationId" type="ser:guid"/>
    <xs:element minOccurs="0" name="EnableNicknames" type="xs:boolean"/>
    <xs:element minOccurs="0" name="EnablePhonetic" type="xs:boolean"/>
    <xs:element minOccurs="0" name="EnableStemming" type="xs:boolean"/>
    <xs:element minOccurs="0" name="HighlightedSentenceCount"
type="xs:int"/>
    <xs:element minOccurs="0" name="Hint"
xmlns:q8="http://schemas.datacontract.org/2004/07/Microsoft.Office.Server.Search.
Query" type="q8:QueryHint"/>
    <xs:element minOccurs="0" name="HitHighlightedProperties"
nillable="true"
xmlns:q9="http://schemas.microsoft.com/2003/10/Serialization/Arrays"
type="q9:ArrayOfanyType"/>
    <xs:element minOccurs="0" name="IgnoreAllNoiseQuery"
type="xs:boolean"/>
    <xs:element minOccurs="0" name="KeywordInclusion"
xmlns:q10="http://schemas.datacontract.org/2004/07/Microsoft.Office.Server.
Search.Query" type="q10:KeywordInclusion"/>
    <xs:element minOccurs="0" name="Locale" type="xs:int"/>
    <xs:element minOccurs="0" name="PagingCookie" nillable="true"
xmlns:q11="http://schemas.datacontract.org/2004/07/Microsoft.Office.Server.
Search.Query" type="q11:PagingCookie"/>
    <xs:element minOccurs="0" name="PartitionId" type="ser:guid"/>
    <xs:element minOccurs="0" name="PersonalizationData" nillable="true"
type="tns:QueryPersonalizationData"/>
    <xs:element minOccurs="0" name="QueryText" nillable="true"
type="xs:string"/>
    <xs:element minOccurs="0" name="RankingModelId" nillable="true"
type="xs:string"/>
    <xs:element minOccurs="0" name="ResultTypes"
xmlns:q12="http://schemas.datacontract.org/2004/07/Microsoft.Office.Server.
Search.Query" type="q12:ResultType"/>
    <xs:element minOccurs="0" name="ResultsProvider"
xmlns:q13="http://schemas.datacontract.org/2004/07/Microsoft.Office.Server.
Search.Query" type="q13:SearchProvider"/>
    <xs:element minOccurs="0" name="RowLimit" type="xs:int"/>
    <xs:element minOccurs="0" name="Sid" nillable="true" type="xs:string"/>
    <xs:element minOccurs="0" name="SiteId" type="ser:guid"/>
    <xs:element minOccurs="0" name="StartRow" type="xs:int"/>
    <xs:element minOccurs="0" name="Timeout" type="xs:int"/>
    <xs:element minOccurs="0" name="TotalRowsExactMinimum" type="xs:int"/>
    <xs:element minOccurs="0" name="TrimDuplicates" type="xs:boolean"/>
    <xs:element minOccurs="0" name="UrlZone"
xmlns:q14="http://schemas.datacontract.org/2004/07/Microsoft.SharePoint.Administration"
type="q14:SPUrlZone"/>
    </xs:sequence>
</xs:complexType>
```

In this example, elements belonging the "QueryProperties" type include an "AlertInfo" element, an "AuthenticationType" element, a "CorrelationId" element, an "EnableNicknames" element, an "EnablePhonetic" element, an "EnableStemming" element, a "HighlightedSentenceCount" element, a "Hint" element, a "HitHighlightedProperties" element, an "IgnoreAllNoiseQuery" element, a "KeywordInclusion" element, a "Locale" element, a "PagingCookie" element, a "PartitionId" element, a "PersonalizationData" element, a "QueryText" element, a "RankingModeId" element, a "ResultTypes" element, a "ResultsProvider" element, a "RowLimit" element, a "Sid" element, a "SiteId" element, a "StartRow" element, a "TotalRowsExactMinimum" element, a "TrimDuplicates" element, and a "UrlZone" element.

The "AlertInfo" element specifies a type of search alert that the search component 204 is to provide to the front end component 206 when a content item responsive to the search query is discovered, modified, or otherwise changed. The "AuthenticationInfo" element specifies a type of search security descriptor used for security trimming. The "CorrelationId" elements specifies a globally unique identifier (GUID) used to log information for a search query. The "EnableNicknames" element specifies whether exact tokens in the query string are used to find crawled content items or if nicknames of the tokens are considered. The "EnablePhonetic" element specifies whether phonetic forms of tokens in the query string are to be used to locate crawled content items. The "EnableStemming" element specifies whether inflectional forms of tokens in the query string are to be used to locate crawled content items. The "HighlightedSentenceCount" element specifies, in multiples of sixty-five characters, the maximum length of the "HitHighlightedSummary" property of query results. The "Hint" property specifies whether the search component 204 is to use a metadata index or a full-text index catalog when processing the search query. A metadata index is a data structure on the data source component 202 that stores properties that are associated with each content item, and attributes of those properties. A full-text index catalog is a collection of full-text index components and other files that are organized in a specific directory structure and contain the data that is needed to perform search queries (e.g., the index 214). The "HitHighlightedProperties" element specifies a list of properties that the search component 204 includes in the hit highlighted properties for each query result. The "IgnoreAllNoiseQuery" element specifies how the search component 204 is to respond to the search query when the search query contains only noise words. A noise word is a language-specific token that is not indexed and is ignored in a query. The "Locale" element specifies a language of the query string as a locale identifier (LCID). The "PagingCookie" element specifies a client-side state cookie. The "PartitionId" element specifies a GUID of a search partition used for the search query. The "PersonalizationData" element specifies a unique identifier for the current user on whose behalf the search query is executed. The "QueryText" element specifies the query string for the search query. The query string contains one or more tokens (i.e., query terms). The "ResultTypes" element specifies a type of query results to be returned for the search query. The "ResultsProvider" element specifies a data source component used for the search query. The "RowLimit" element specifies the number of query results that the front end component 206 wants to receive, starting at the index specified in the "StartRow" element. The "Sid" element specifies a security descriptor for the user on whose behalf the search query is executed. The "SiteId" element specifies a site identifier of a site used by the search component 204 to identify the context of the search query. The "StartRow" element specifies a zero-based index of the first query result in the list of query results to be returned by the search component 204. The "Timeout" element specifies a maximum time in milliseconds that the search component 204 spends in executing the search query. The "TotalRowsExactMinimum" element specifies a total number of query results, starting at the index specified in the "StartRow" element, up until the search component 204 returns the exact count in the "TotalRows" element in the "ResultTable" element. The "TrimDuplicates" element specifies whether duplicate query results are removed by the search component 204 before sorting, selecting, and sending the query results. The "UrlZone" element specifies a zone used for alternate access mapping for the search query.

Elements belonging to the "KeywordQueryProperties" type conform to the following schema:

```
<xs:complexType name="KeywordQueryProperties"
xmlns:xs="http://www.w3.org/2001/XMLSchema">
    <xs:complexContent mixed="false">
        <xs:extension base="tns:QueryProperties">
            <xs:sequence>
                <xs:element minOccurs="0" name="CollapseNum" type="xs:int"/>
                <xs:element minOccurs="0" name="CollapseOn" nillable="true"
type="xs:string"/>
                <xs:element minOccurs="0" name="ContextGroupID" nillable="true"
type="xs:string"/>
                <xs:element minOccurs="0" name="EnableFQL" type="xs:boolean"/>
                <xs:element minOccurs="0" name="EnableRefinement"
type="xs:boolean"/>
                <xs:element minOccurs="0" name="EnableSpellcheck"
xmlns:q1="http://schemas.datacontract.org/2004/07/Microsoft.Office.Server.Search.Query"
type="q1:SpellcheckMode"/>
                <xs:element minOccurs="0" name="EnableUrlSmashing"
type="xs:boolean"/>
                <xs:element minOccurs="0" name="Filter" nillable="true"
type="xs:string"/>
                <xs:element minOccurs="0" name="HiddenConstraints" nillable="true"
type="xs:string"/>
                <xs:element minOccurs="0" name="MaxShallowRefinementHits"
type="xs:int"/>
                <xs:element minOccurs="0" name="RefinementFilters" nillable="true"
xmlns:q2="http://schemas.microsoft.com/2003/10/Serialization/Arrays"
type="q2:ArrayOfstring"/>
                <xs:element minOccurs="0" name="RefinementTokens" nillable="true"
xmlns:q3="http://schemas.microsoft.com/2003/10/Serialization/Arrays"
type="q3:ArrayOfanyType"/>
                <xs:element minOccurs="0" name="Refiners" nillable="true"
type="xs:string"/>
                <xs:element minOccurs="0" name="ResubmitFlags"
xmlns:q4="http://schemas.datacontract.org/2004/07/Microsoft.Office.Server.Search.Query"
type="q4:ResubmitFlag"/>
                <xs:element      minOccurs="0"       name="ResultView"       nillable="true"
type="xs:string"/>
                <xs:element minOccurs="0" name="SelectProperties" nillable="true"
xmlns:q5="http://schemas.microsoft.com/2003/10/Serialization/Arrays"
type="q5:ArrayOfanyType"/>
                <xs:element minOccurs="0" name="SimilarTo" nillable="true"
type="xs:string"/>
                <xs:element minOccurs="0" name="SimilarType" nillable="true"
type="xs:string"/>
                <xs:element minOccurs="0" name="SortBy" nillable="true"
type="xs:string"/>
                <xs:element minOccurs="0" name="SortList" nillable="true"
type="tns:SortCollection"/>
                <xs:element minOccurs="0" name="SortSimilar" type="xs:boolean"/>
                <xs:element minOccurs="0" name="TimeZone" nillable="true"
xmlns:q6="http://schemas.datacontract.org/2004/07/System"
type="q6:TimeZoneInfo"/>
                <xs:element minOccurs="0" name="UserContextData" nillable="true"
type="xs:string"/>
```

```
        </xs:sequence>
      </xs:extension>
    </xs:complexContent>
</xs:complexType>
```

In this example, the "KeywordQueryProperties" type extends the "QueryProperties" type. In addition to the elements defined in the "QueryProperties" type, elements belonging to the "KeywordQueryProperties" type are allowed to include a "CollapseNum" element, a "CollapseOn" element, a "ContextGroupID" element, an "EnableFQL" element, an "EnableRefinement" element, an "EnableSpellCheck" element, an "EnableUrlSmashing" element, a "Filter" element, a "HiddenConstraintsElement" element, a "MaxShallowRefinementHits" element, a "RefinementFilters" element, a "RefinementTokens" element, a "Refiners" element, a "Resubmit Flags" element, a "ResultView" element, a "SelectProperties" element, a "SimilarTo" element, a "SimilarType" element, a "SortBy" element, a "SortList" element, a "SortSimilar" element, a "TimeZone" element, and a "UserContextData" element. Each of these elements, aside from the "EnableUrlSmashing" element, the "HiddenConstraints" element, the "SelectProperties" element, the "SortList" element, and the "TimeZone" element, are only applicable when the data source component 202 is a FAST™ data source. The "EnableFQL" element, the "EnableRefinement" element, the "Filter" element, the "RefinementTokens" element, the "ResultView" element, and the "SortBy" element are reserved. The "ContextGroupID" element specifies an identifier used to group keywords used for matching best bets and featured content to the search query. The "EnableSpellCheck" element specifies how the search component 204 suggests a different spelling of the search query. The "EnableUrlSmashing" element specifies whether the search component 204 combines the tokens of the query string to form a query result with a URL formed by combining the tokens. The "HiddenConstraints" element specifies additional query terms that the search component 204 appends to the "query text" element. The "MaxShallowRefinementHits" element specifies a number of results to be used to calculate refinement results. The "MaxShallowRefinementHits" element is only applied to refiners that are specified to have shallow refinement. The "RefinementFilters" element specifies a list of refinement tokens for drilldown into query results. The "Refiners" element specifies refiners. A refiner is a configuration that is used for query refinement and is associated with one managed property. The "ResubmitFlags" element specifies how the search component 204 behaves if no query results are returned for the search query. The "SelectProperties" element specifies a list of managed properties that the search component 204 returns for each query result. The "SimilarTo" element specifies a document vector used for similarity comparison. The document vector indicates the most important terms in a query result, and a corresponding weight. The "SimilarType" element specifies how the search component 204 transforms the search query when the "SimilarTo" element is set. The "SortList" element specifies a list of properties to sort the query results by. The "SortSimilar" element specifies sorting of query results based on similarity of the query results. The "TimeZone" element specifies a time zone of a current process. The "UserContextData" element specifies user context data.

Elements conforming to the "FullTextSqlQueryProperties" type conform to the following schema:

```
<xs:complexType name="FullTextSqlQueryProperties"
  xmlns:xs="http://www.w3.org/2001/XMLSchema">
    <xs:complexContent mixed="false">
      <xs:extension base="tns:QueryProperties">
        <xs:sequence/>
      </xs:extension>
    </xs:complexContent>
</xs:complexType>
```

In this example, the "FullTextSqlQueryProperties" type does not add any additional elements to the "QueryProperties" type.

When the search component 204 invokes the execute method in response to receiving an execute request, the web API 212 generates an execute response. The execute response is a web services response that is responsive to the execute request. The execute response contains the requested properties of the query results for the search query. The requested properties of the query results are sorted according to the order specified in the execute request. In addition, the execute response specifies an amount of time consumed by the search component 204 to process the execute request.

In various embodiments, the execute response includes various additional properties. For example, in some embodiments, the execute response includes a database time property, a definition property, an elapsed time property, an ignored noise words property, a keyword information property, a query machine property, a query modification property, an intermediate processing time property, a query terms property, a spelling suggestion property, and an array of result tables. The database time property indicates an amount of time consumed to execute database operations for retrieving the query results. The database operations are operations performed by the search component 204 to retrieve properties of query results from the data source component 202. The definition property indicates an array of extracted definitions for the search query. An extracted definition is a definition that is obtained by an index server during a crawl, to identify if any sentences in the content items match a pattern defining a term. The elapsed time property indicates an amount of time consumed to process the execute request. In other words, the elapse time property indicates the latency data. The ignored noise words property indicates an array of noise words in the search query. The search component 204 stores a list of authored definitions for certain tokens. The keyword information property indicates a token and associated definition in the list of authored definitions. The query machine property indicates a name of a computer that is running the search service that executed the execute request. The query modification property is applicable only when the data source component 202 is a FAST™ data source. The query modification property is a modified search query. The search component 204 modifies the search query to the modified search query if spell check mode is on. The intermediate processing time property indicates an amount of time consumed by intermediate processing of the search query on the search component 204. Intermediate processing is processing by the search component 204 aside from database operations. The query terms property indicates an array of tokens extracted from the search query in an order in which the tokens occur. The spelling suggestion property indicates a spelling suggestion for the search query. The result tables contain query results for the search query.

In various embodiments, the execute response is formatted in various ways. For example, in some embodiments, the execute response is formatted as a SOAP response comprising XML elements. The XML elements conform to the following schema:

```
<xs:element name="ExecuteResponse"
xmlns:xs="http://www.w3.org/2001/XMLSchema">
   <xs:complexType>
      <xs:sequence>
         <xs:element minOccurs="0" name="ExecuteResult"
nillable="true" xmlns:q5="http://www.microsoft.com/sharepoint/search/
KnownTypes/2008/08" type="q5:ResultTableCollection"/>
      </xs:sequence>
   </xs:complexType>
</xs:element>
```

In this example, the "ExecuteResponse" element contains an "ExecuteResult" element. The "ExecuteResult" element contains the query results for the search query.

Furthermore, in this example, the "ExecuteResult" element belongs to the "ResultTableCollection" type. Elements belonging to the "ResultTableCollection" type conform to the following schema:

```
<xs:complexType name="ResultTableCollection"
xmlns:xs="http://www.w3.org/2001/XMLSchema">
   <xs:sequence>
      <xs:element minOccurs="0" name="DatabaseTime" type="xs:int"/>
      <xs:element minOccurs="0" name="Definition" nillable="true"
type="tns:ArrayOfResultDefinition"/>
      <xs:element minOccurs="0" name="ElapsedTime" type="xs:int"/>
      <xs:element minOccurs="0" name="IgnoredNoiseWords"
nillable="true" xmlns:q20="http://schemas.microsoft.com/2003/10/
Serialization/Arrays" type="q20:ArrayOfstring"/>
      <xs:element minOccurs="0" name="KeywordInformation"
nillable="true" type="tns:KeywordInformation"/>
<xs:element minOccurs="0" name="QueryMachine" nillable="true"
type="xs:string"/>
      <xs:element minOccurs="0" name="QueryModification"
nillable="true" type="xs:string"/>
      <xs:element minOccurs="0" name="QueryProcessingTime"
type="xs:int"/>
      <xs:element minOccurs="0" name="QueryTerms" nillable="true"
xmlns:q21="http://schemas.microsoft.com/2003/10/Serialization/Arrays"
type="q21:ArrayOfstring"/>
      <xs:element minOccurs="0" name="SpellingSuggestion"
nillable="true" type="xs:string"/>
      <xs:element minOccurs="0" name="m_ResultTables"
nillable="true" xmlns:q22="http://schemas.microsoft.com/2003/10/
Serialization/Arrays"
type="q22:ArrayOfKeyValueOfResultTypeResultTableUTLV0zE5"/>
   </xs:sequence>
</xs:complexType>
```

In this example, the "DatabaseTime" element specifies the database time property, the "Definition" element specifies the definition property, the "ElapsedTime" element specifies the elapsed time property, the "IgnoredNoiseWords" element specifies the ignored noise words property, the "KeywordInformation" element specifies the keyword information property, the "QueryMachine" element specifies the query machine property, the "QueryModification" element specifies the query modification property, the "QueryProcessingTime" element specifies the intermediate processing time property, the "QueryTerms" element specifies the query terms property, the "SpellingSuggestion" element specifies the spelling suggestion property, and the "m_ResultTables" element comprises the result tables.

In this example, the "m_ResultTables" element belongs to the "ArrayOfKeyValueOfResultTypeResultTableUTLV0zE5" type. Elements belonging to the "ArrayOfKeyValueOfResultTypeResultTableUTLV0zE5" type contain lists of zero or more key elements and value elements. Each pair of key elements and value elements represents a set of query results of a specific type. Elements belonging to the "ArrayOfKeyValueOfResultTypeResultTableUTLV0zE5" type conform to the following schema:

```
<xs:complexType
name="ArrayOfKeyValueOfResultTypeResultTableUTLV0zE5"
xmlns:xs="http://www.w3.org/2001/XMLSchema">
   <xs:annotation>
      <xs:appinfo>
         <IsDictionary
xmlns="http://schemas.microsoft.com/2003/10/Serialization/">true
         </IsDictionary>
      </xs:appinfo>
   </xs:annotation>
   <xs:sequence>
      <xs:element minOccurs="0" maxOccurs="unbounded"
name="KeyValueOfResultTypeResultTableUTLV0zE5">
         <xs:complexType>
            <xs:sequence>
               <xs:element name="Key"
xmlns:q1="http://schemas.datacontract.org/2004/07/
Microsoft.Office.Server.Search.Query" type="q1:ResultType"/>
               <xs:element name="Value" nillable="true"
xmlns:q2="http://www.microsoft.com/sharepoint/search/KnownTypes/
2008/08" type="q2:ResultTable"/>
            </xs:sequence>
         </xs:complexType>
      </xs:element>
   </xs:sequence>
</xs:complexType>
```

In this example, the "KeyValueOfResultTypeResultTableUTLV0zE5" element represents query results of a specific type. The "Key" element within the "KeyValueOfResultTypeResultTableUTLV0zE5" element specifies the type of query results present in the "Value" element within the "KeyValueOfResultTypeResultTableUTLV0zE5" element. The "Value" element within the "KeyValueOfResultTypeResultTableUTLV0zE5" element is a set of query results of the type specified in the "Key" element. In this example, the "Key" element belongs to the "ResultTable" type.

Elements belonging to the "ResultTable" type contain lists of query results. Elements belonging to the "ResultTable" type conform to the following schema:

```
<xs:complexType name="ResultTable"
xmlns:xs="http://www.w3.org/2001/XMLSchema">
   <xs:sequence>
      <xs:element minOccurs="0" name="IsTotalRowsExact"
type="xs:boolean"/>
      <xs:element minOccurs="0" name="ResultType"
xmlns:q23="http://schemas.datacontract.org/2004/07/
```

-continued

```
Microsoft.Office.Server.Search.Query" type="q23:ResultType"/>
    <xs:element minOccurs="0" name="RowCount" type="xs:int"/>
    <xs:element minOccurs="0" name="Table" nillable="true">
      <xs:complexType>
        <xs:annotation>
          <xs:appinfo>
            <ActualType Name="DataTable"
Namespace="http://schemas.datacontract.org/2004/07/System.Data"
xmlns="http://schemas.microsoft.com/2003/10/Serialization/"/>
          </xs:appinfo>
        </xs:annotation>
        <xs:sequence>
          <xs:any minOccurs="0" maxOccurs="unbounded"
namespace="http://www.w3.org/2001/XMLSchema"
processContents="lax"/>
          <xs:any minOccurs="1" namespace="urn:schemas-
microsoft-com:xml-diffgram-v1" processContents="lax"/>
        </xs:sequence>
      </xs:complexType>
    </xs:element>
    <xs:element minOccurs="0" name="TotalRows" type="xs:int"/>
  </xs:sequence>
</xs:complexType>
```

In this example, the "IsTotalRowsExact" element specifies "true" if the number given in the "TotalRows" element is an exact number and specifies "false" if the number given in the "TotalRows" element is an approximation. The "ResultType" element specifies the type of results specified in the "Table" element. The "RowCount" element specifies a number of rows in the "Table" element. The "Table" element contains a table of query results. The "Table" element is encoded as an ADO.NET DataTable element using the DiffGram format. The "Table" element conforms to one of the following types of tables: a RelevantResults table, a SpecialTermResults table, a HighConfidenceResults table, a FeaturedContentResults table, or a RefinementResults table. The "TotalRows" element contains an approximation of the total number of query results for the search query that are of the type specified by the "ResultType" element.

A RelevantResults table contains actual query results. A SpecialTermResults table contains best bets that apply to the search query. A HighConfidenceResults table contains high confidence results that apply to the search query. High confidence results are query results that are considered to be highly relevant because of a precise match between a high confidence property value and the tokens in the query text. A high confidence property is a managed property from a metadata index that an administrator identifies as a good indicator of a highly relevant content item. The FeaturedContentResults table contains featured content that apply to the search query. The FeatureContentResults table is used only when data source component 202 is a FAST™ data source. The RefinementResults table contains refinement results that apply to the search query. The RefinementResults table is used only when the database is a FAST™ data source.

Get Top Query Strings for URL

The web API 212 also includes a "get top query strings for URL" method. The search component 204 invokes the "get top query strings for URL" method when the search component 204 receives a "get top query strings for URL" request. The "get top query strings for URL" request is a web services request to invoke the "get top query string for URL" method. The "get top query strings for URL" request specifies a URL. The front end component 206 uses the "get top query strings for URL request" to obtain a list of the top query strings for which the URL was returned. For example, the URL may be returned in responses to 2000 search queries. At least some of the 2000 search queries are the same. A response to the "get top query string for URL" request contains search queries occurring most frequently among the 2000 search queries.

In various embodiments, "the get top query strings for URL request" is formatted in various ways. For example, in some embodiments, the "get top query strings for URL" request is formatted as a SOAP request comprising XML elements. The XML elements conform to the following schema:

```
<xs:element name="GetTopQueryStringsForUrl"
xmlns:xs="http://www.w3.org/2001/XMLSchema">
  <xs:complexType>
    <xs:sequence>
      <xs:element minOccurs="0" name="url" nillable="true"
type="xs:string"/>
      <xs:element minOccurs="0" name="topCount" type="xs:int"/>
    </xs:sequence>
  </xs:complexType>
</xs:element>
```

The "GetTopQueryStringsForUrl" element represents the "get top query strings for URL request." The "GetTopQueryStringsForUrl" element contains a "url" element and a "topCount" element. The "url" element specifies the URL for which corresponding search queries are returned by the search component 204. The "topCount" element specifies a number of search queries to return.

When the search component 204 invokes the "get top query strings for URL" method in response to receiving a "get top query strings for URL" request, the web API 212 generates a "get top query strings for URL" response. The "get top query strings for URL" response specifies a list of most frequently occurring search queries corresponding to the given URL.

In various embodiments, the "get top query strings for URL" response is formatted in various ways. For example, in some embodiments, the "get top query strings for URL" response is formatted as a SOAP response comprising XML elements. The XML elements conform to the following schema:

```
<xs:element name="GetTopQueryStringsForUrlResponse"
xmlns:xs="http://www.w3.org/2001/XMLSchema">
  <xs:complexType>
    <xs:sequence>
      <xs:element minOccurs="0"
name="GetTopQueryStringsForUrlResult" nillable="true"
xmlns:q15="http://schemas.microsoft.com/2003/10/Serialization/Arrays"
type="q15:ArrayOfstring"/>
    </xs:sequence>
  </xs:complexType>
</xs:element>
```

In this example, the "GetTopQueryStringsForUrlResponse" element represents the "get top query strings for URL" response. The "GetTopQueryStringsForUrlResponse" element contains a "GetTopQueryStringsForUrlResult" element. The "GetTopQueryStringsForUrlResponse" element contains a list of the most frequently occurring search queries corresponding to the given URL.

Record UI Query Done Event

The web API 212 also includes a record UI query done event method. The search component 204 invokes the record UI query done event method when the search component 204 receives a record interface latency request. The record interface latency request is a web services request to invoke the record UI query done event method. The record UI query done event method is also referred to herein as the record interface latency method.

The front end component 206 can receive one or more search requests in a given time period. The front end component 206 uses the record interface latency request to inform the search component 204 about the search query latency for the search queries received by the front end component 206 within the given time period. In various embodiments, the given time period has various lengths. For example, in some embodiments, the given time period has a length of sixty seconds. In other embodiments, the given time period has a length of 120 seconds.

In various embodiments, the record interface latency request specifies various data. For example, in some embodiments, the record interface latency request contains aggregated latency information and/or verbose latency information. The aggregated latency information contains aggregated information about amounts of time consumed by the front end component 206 in processing search requests during the given time period. The verbose latency information contains separate information about an amount of time consumed by the front end component 206 in processing individual search requests during the given time period.

In various embodiments, the record UI latency request is formatted in various ways. For example, in some embodiments, the record interface latency request is formatted as a SOAP request comprising XML elements. The XML elements conform to the following schema:

```
<xs:element name="RecordUIQueryDoneEvent"
xmlns:xs="http://www.w3.org/2001/XMLSchema">
    <xs:complexType>
        <xs:sequence>
            <xs:element minOccurs="0" name="buffer" nillable="true"
xmlns:q18="http://www.microsoft.com/sharepoint/search/KnownTypes/
2008/08" type="q18:UIQueryLatencyDataBuffer"/>
        </xs:sequence>
    </xs:complexType>
</xs:element>
```

In this example, the "RecordUIQueryDoneEvent" represents the record interface latency request. The "RecordUIQueryDoneEvent" contains a "buffer" element. The "buffer" element contains aggregated latency information. Furthermore, when verbose query monitoring is turned on, the "buffer" element contains verbose latency information. The "buffer" element belongs to the "UIQueryLatencyDataBuffer" type. Elements conforming to the "UIQueryLatencyDataBuffer" type conform to the following schema:

```
<xs:complexType name="UIQueryLatencyDataBuffer"
xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="AggregatedQueryTimings"
nillable="true"
type="tns:ArrayOfAggregatedUIQueryLatencyDataBuffer"/>
                <xs:element minOccurs="0" name="VerboseQueryTimings"
nillable="true" type="tns:ArrayOfVerboseUIQueryLatencyDataBuffer"/>
            </xs:sequence>
        </xs:extension>
    </xs:complexContent>
</xs:complexType>
```

The "UIQueryLatencyDataBuffer" type extends the "DataBuffer" type described elsewhere in this document. In addition, elements conforming to the "UIQueryLatencyDataBuffer" type include an "AggregatedQueryTimings" element and can include a "VerboseQueryTimings" element. The "AggregatedQueryTimings" element specifies the aggregated latency information. The "VerboseQueryTimings" element specifies details of the search query latency for each of the search queries received during the given time period.

The "AggregatedQueryTimings" element belongs to the "ArrayOfAggregatedUIQueryLatencyDataBuffer" type. Elements belonging to the "ArrayOfAggregatedUIQueryLatencyDataBuffer" type contain a list of elements conforming to an "AggregatedUIQueryLatencyDataBuffer" type. Each of the elements conforming to the "AggregatedUIQueryLatencyDataBuffer" type contains aggregated latency information for a search results page. A search results page is a web page containing data regarding query results for a search query. Elements conforming to the "AggregatedUIQueryLatencyDataBuffer" type conform to the following schema:

```
<xs:complexType name="AggregatedUIQueryLatencyDataBuffer"
xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="ExclusiveWebpartTimeMs"
type="xs:int"/>
                <xs:element minOccurs="0" name="InclusiveWebpartTimeMs"
type="xs:int"/>
                <xs:element minOccurs="0" name="NumQueries"
type="xs:int"/>
                <xs:element minOccurs="0" name="TotalQueryTimeMs"
type="xs:int"/>
            </xs:sequence>
        </xs:extension>
    </xs:complexContent>
</xs:complexType>
```

In this example, the "AggregatedUIQueryLatencyDataBuffer" type extends the "DataBuffer" type described elsewhere in this document. In addition, elements conforming to the "AggregatedUIQueryLatencyDataBuffer" type include an "ExclusiveWebpartTimeMs" element, an "InclusiveWebpartTimeMs" element, a "NumQueries" element, and a "TotalQueryTimeMs" element. The "ExclusiveWebPartTimeMs" element specifies a total time in milliseconds for the web parts on a search results page to process the search queries received during the time period. The "InclusiveWebPartTimeMs" element specifies a total time in milliseconds of all web parts on the search results page to process the search query. The "NumQueries" element specifies a number of search queries received during the time period. The "TotalQueryTimeMs" element specifies a total time in milliseconds for the search results page to process search queries. In other words, the "TotalQueryTimeMs" element specifies an amount of time consumed by the front end component 206 between when the front end component 206 received a search query and when the front end component 206 sent corresponding user interface data.

The "VerboseQueryTimings" element belongs to an "ArrayOfVerboseUIQueryLatencyDataBuffer" type. Elements belonging to the "ArrayOfVerboseUIQueryLatencyDataBuffer" type conform to the following schema:

```
<xs:complexType name="ArrayOfVerboseUIQueryLatencyDataBuffer"
xmlns:xs="http://www.w3.org/2001/XMLSchema">
    <xs:sequence>
        <xs:element minOccurs="0" maxOccurs="unbounded"
name="VerboseUIQueryLatencyDataBuffer" nillable="true"
type="tns:VerboseUIQueryLatencyDataBuffer"/>
    </xs:sequence>
</xs:complexType>
```

In this example, the "ArrayOfVerboseUIQueryLatencyDataBuffer" element contains a sequence of "VerboseUIQueryLatencyDataBuffer" elements. Each of the "VerboseUIQueryLatencyDataBuffer" elements specifies the latency in processing a search results page when executing a single search query. The "VerboseUIQueryLatencyDataBuffer" elements conform to the "VerboseUIQueryLatencyDataBuffer" type. Elements conforming to the "VerboseUIQueryLatencyDataBuffer" type conform to the following schema:

```
<xs:complexType name="VerboseUIQueryLatencyDataBuffer"
xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="CorrelationId"
                    type="ser:guid"/>
                <xs:element minOccurs="0" name="ExclusiveWebpartTimeMs"
type="xs:int"/>
                <xs:element minOccurs="0" name="InclusiveWebpartTimeMs"
type="xs:int"/>
                <xs:element minOccurs="0" name="QueryTerms"
nillable="true" type="xs:string"/>
                <xs:element minOccurs="0" name="TotalQueryTimeMs"
                    type="xs:int"/>
                <xs:element minOccurs="0" name="Url" nillable="true"
type="xs:string"/>
            </xs:sequence>
        </xs:extension>
    </xs:complexContent>
</xs:complexType>
```

In this example, the "VerboseUIQueryLatencyDataBuffer" type extends the "DataBuffer" type described elsewhere in this document. Furthermore, elements conforming to the "VerboseUIQueryLatencyDataBuffer" type include a "CorrelationId" element, an "ExclusiveWebpartTimeMs" element, an "InclusiveWebpartTimeMs" element, a "QueryTerms" element, a "TotalQueryTimeMs" element, and a "Url" element. The "CorrelationId" element specifies the unique identifier that the front end component 206 specified in a "CorrelationId" element in an execute request. The "ExclusiveWebpartTimeMs" element specifies a time in milliseconds for all search-related web parts on the search results page to process the search query. The "InclusiveWebpartTimeMs" element specifies a time in milliseconds for all web parts on the search results page to process the search query. The "QueryTerms" element specifies the query terms of the search query. The "TotalQueryTimeMs" element specifies a latency in milliseconds for the search results page to process the search query. The "Url" element specifies a URI of a page that issues the search query.

When the search component 204 invokes the record UI query done event method in response to receiving a record interface latency request, the web API 212 generates a record interface latency response. The record interface latency response is a web services response that is responsive to the record interface latency request. The record interface latency response specifies whether verbose query monitoring is turned on for the search application 216.

In various embodiments, the record interface latency response is formatted in various ways. For example, in some embodiments, the record interface latency response is formatted as a SOAP response comprising XML elements. The XML elements conform to the following schema:

```
<xs:element name="RecordUIQueryDoneEventResponse"
xmlns:xs="http://www.w3.org/2001/XMLSchema">
    <xs:complexType>
        <xs:sequence>
            <xs:element minOccurs="0"
                name="RecordUIQueryDoneEventResult"
type="xs:boolean"/>
        </xs:sequence>
    </xs:complexType>
</xs:element>
```

In this example, the "RecordUIQueryDoneEventResponse" element represents the record interface latency response. The "RecordUIQueryDoneEventResponse" element comprises a "RecordUIQueryDoneEventResult" element that specifies whether verbose query monitoring is turned on for the search application 216.

Get Scopes

The web API 212 also includes a get scopes method. The search component 204 invokes the get scopes method when the search component 204 receives a get scopes request. The get scopes request is a web services request to invoke the get scopes method. The get scopes request includes data that identifies a search scope consumer. The search scope consumer is a website through which the search request is received. The front end component 206 uses the get scopes request to obtain a list of search scopes available to the search scope consumer.

In various embodiments, the get scopes request is formatted in various ways. For example, in some embodiments, the get scopes request is a SOAP request comprising XML elements. The XML elements conform to the following schema:

```
<xs:element name="GetScopes"
xmlns:xs="http://www.w3.org/2001/XMLSchema">
    <xs:complexType>
        <xs:sequence>
            <xs:element minOccurs="0" name="properties" nillable="true"
xmlns:q8="http://www.microsoft.com/sharepoint/search/KnownTypes/
2008/08" type="q8:QueryProperties"/>
        </xs:sequence>
    </xs:complexType>
</xs:element>
```

In this example, the "properties" element includes a query property that identifies the search scope consumer.

When the search component 204 invokes the get scopes method in response to receiving a get scopes response, the web API generates a get scopes response. The get scopes response is a web services response that is responsive to the get scopes request. The get scopes response contains information about a set of available search scopes. The set of available search scopes comprises search scopes that are available to the search component 204 for the search scope consumer.

A search scope is a pre-defined list of attributes that defines a collection of content items. For example, a "people" search scope is a list of attributes that define a collection of content items regarding people. In this example, the list of attributes can include "first name," "surname," "telephone number," "email address," and other attributes. Each of the search scopes has a name, a unique identifier, and a description. Each attribute in the list of attributes of a search scope is referred to herein as a search scope rule.

In various embodiments, the get scopes response includes various types of information about search scopes. For example, in some embodiments, the get scopes response includes a description, an identifier, a name, and a state for each search scope. The description of a search scope describes the search scope. The identifier of a search scope specifies a unique identifier of the search scope. The name of a search scope specifies a name of the search scope. The state of the search scope specifies a compilation state of the search scope.

Search scope compilation is a process of updating a full-text index catalog (e.g., the index 214) to reflect unincorporated changes to a definition of a search scope. The compilation state of a search scope is the state of search scope compilation for the search scope. Example compilation states for a search scope include "empty," "invalid," "query expanded," "needs compilation," "compiled," and "needs recompilation." When the compilation state of a search scope is "empty," the search scope contains no content items. When the compilation state of a search scope is "invalid," the search scope is invalid. When the compilation state of a search scope is "query expanded," the search scope is expanded at query time. When the compilation state of a search scope is "needs compilation," the full-text index catalog has not yet been updated to reflect changes to the definition of the search scope. When the compilation state of a search scope is "compiled," the full-text index catalog has been updated to reflect a current definition of the search scope. When the compilation state of a search scope is "need recompilation," the full-text index catalog needs to be updated to reflect a current definition of the search scope.

In various embodiments, the get scopes response is formatted in various ways. For example, in some embodiments, the get scopes response is formatted as a SOAP response comprising XML elements. In some embodiments, the XML elements conform to the following schema:

```
<xs:element name="GetScopesResponse"
xmlns:xs="http://www.w3.org/2001/XMLSchema">
    <xs:complexType>
        <xs:sequence>
            <xs:element minOccurs="0" name="GetScopesResult"
nillable="true" xmlns:q9="http://www.microsoft.com/sharepoint/search/
KnownTypes/2008/08" type="q9:ArrayOfScopeInformation"/>
        </xs:sequence>
    </xs:complexType>
</xs:element>
```

In this example, the "GetScopesResult" element represents the get scopes response. The "GetScopesResult" element belongs to an "ArrayOfScopeInformation" type. Elements belonging to the "ArrayOfScopeInformation" type conform to the following schema:

```
<xs:complexType name="ArrayOfScopeInformation"
xmlns:xs="http://www.w3.org/2001/XMLSchema">
    <xs:sequence>
        <xs:element minOccurs="0" maxOccurs="unbounded"
name="ScopeInformation"
```

-continued

```
nillable="true" type="tns:ScopeInformation"/>
    </xs:sequence>
</xs:complexType>
```

In this example, elements belonging to the "ArrayOfScopeInformation" type are allowed to include one or more "ScopeInformation" elements. The "ScopeInformation" elements contain information about a search scope. The "ScopeInformation" elements belong to a "ScopeInformation" type. Elements belonging to the "ScopeInformation" type conform to the following schema:

```
<xs:complexType name="ScopeInformation"
xmlns:xs="http://www.w3.org/2001/XMLSchema">
    <xs:sequence>
        <xs:element minOccurs="0" name="Description" nillable="true"
type="xs:string"/>
        <xs:element minOccurs="0" name="Filter" nillable="true"
type="xs:string"/>
        <xs:element minOccurs="0" name="ID" type="xs:int"/>
        <xs:element minOccurs="0" name="Name" nillable="true"
type="xs:string"/>
        <xs:element minOccurs="0" name="State"
xmlns:q24="http://schemas.datacontract.org/2004/07/
Microsoft.Office.Server.Search.Administration"
type="q24:ScopeCompilationState"/>
    </xs:sequence>
</xs:complexType>
```

In this example, elements belonging to the "ScopeInformation" type are allowed to include a "Description" element, a "Filter" element, an "ID" element, a "Name" element, and a "State" element. The "Description" element specifies a description of the search scope. The "Filter" element is reserved. The "ID" element specifies a unique identifier of the search scope. The "Name" element specifies a name of the search scope. The "State" element specifies a compilation state of the search scope. The "State" element belongs to a "ScopeCompilationState" type. Elements belonging to the "ScopeCompilationState" type conform to the following schema:

```
<xs:simpleType name="ScopeCompilationState"
xmlns:xs="http://www.w3.org/2001/XMLSchema">
    <xs:restriction base="xs:string">
        <xs:enumeration value="Empty"/>
        <xs:enumeration value="Invalid"/>
        <xs:enumeration value="QueryExpanded"/>
        <xs:enumeration value="NeedsCompile"/>
        <xs:enumeration value="Compiled"/>
        <xs:enumeration value="NeedsRecompile"/>
    </xs:restriction>
</xs:simpleType>
```

In this example, elements belonging to the "ScopeCompilationState" can specify the value "Empty," the value "Invalid," the value "QueryExpanded," the value "NeedsCompile," the value "Compiled," or the value "NeedsRecompile." These values indicate a compilation state of the search scope.

Record OM Query Done Event

The web API 212 also includes a record OM query done event method. The search component 204 invokes the record OM query done event method when the search component 204 receives a record OM latency request. The record OM latency request is a web services request to invoke the record OM query done event method. The record OM query done event method is also referred to herein as the record object model latency method.

The front end component 206 uses the record OM latency request to provide query performance information to the search component 204. The query performance information is based on latency data for search queries executed on the search component 204. The latency data is reported by the search component 204 in execute responses received from the search component 204. For example, the front end component 206 can send a plurality of execute requests to the search component 204 in a given time period and receive a plurality of execute responses from the search component 204. The record OM latency request includes search performance information based on each of the execute responses. In various embodiments, the given time period has various lengths. For example, in some embodiments, the given time period has a length of sixty seconds. In other embodiments, the given time period has a length of ninety seconds.

In various embodiments, the record OM latency request is formatted in various ways. For example, in some embodiments, the record OM latency request is formatted as a SOAP request comprising XML elements. The XML elements conform to the following schema:

```
<xs:element name="RecordOMQueryDoneEvent"
  xmlns:xs="http://www.w3.org/2001/XMLSchema">
    <xs:complexType>
      <xs:sequence>
        <xs:element minOccurs="0" name="buffer" nillable="true"
  xmlns:q20="http://www.microsoft.com/sharepoint/search/
  KnownTypes/2008/08" type="q20:OMQueryLatencyDataBuffer"/>
      </xs:sequence>
    </xs:complexType>
</xs:element>
```

In this example, the "RecordOMQueryDoneEvent" represents the record OM latency request. The "RecordOMQueryDoneEvent" includes a "buffer" element that conforms to the "OMQueryLatencyDataBuffer" type. Elements conforming to the "OMQueryLatencyDataBuffer" type conform to the following schema:

```
<xs:complexType name="OMQueryLatencyDataBuffer"
  xmlns:xs="http://www.w3.org/2001/XMLSchema">
    <xs:complexContent mixed="false">
      <xs:extension base="tns:DataBuffer">
        <xs:sequence>
          <xs:element minOccurs="0" name="AggregatedQueryTimings"
  nillable="true"
  type="tns:ArrayOfAggregatedOMQueryLatencyDataBuffer"/>
          <xs:element minOccurs="0" name="VerboseQueryTimings"
  nillable="true" type="tns:ArrayOfVerboseOMQueryLatencyDataBuffer"/>
        </xs:sequence>
      </xs:extension>
    </xs:complexContent>
</xs:complexType>
```

In this example, the "OMQueryLatencyDataBuffer" type extends the "DataBuffer" type described elsewhere in this document. In addition, elements conforming to the "OMQueryLatencyDataBuffer" type are allowed to include an "AggregatedQueryTimings" element and a "VerboseQueryTimings" element. The "AggregatedQueryTimings" element specifies an aggregated query latency for all search queries executed by the search component 204 within the given time period. The "VerboseQueryTimings" element specifies details of each of the search queries executed by the search component 204 within the given time period.

The "AggregatedQueryTimings" element belongs to the "ArrayOfAggregatedOMQueryLatencyDataBuffer" type. Elements belonging to the "ArrayOfAggregatedOMQueryLatencyDataBuffer" type conform to the following schema:

```
<xs:complexType
  name="ArrayOfAggregatedOMQueryLatencyDataBuffer"
  xmlns:xs="http://www.w3.org/2001/XMLSchema">
    <xs:sequence>
      <xs:element minOccurs="0" maxOccurs="unbounded"
  name="AggregatedOMQueryLatencyDataBuffer" nillable="true"
  type="tns:AggregatedOMQueryLatencyDataBuffer"/>
    </xs:sequence>
</xs:complexType>
```

Elements belonging to the "ArrayOfAggregatedOMQueryLatencyDataBuffer" type include a list of "AggregatedOMQueryLatencyDataBuffer" elements. Each of the "AggregatedOMQueryLatencyDataBuffer" elements contains the aggregated search query latency for processing search queries on the search component 204 within the given time period. The "AggregatedOMQueryLatencyDataBuffer" elements conform to the "AggregatedOMQueryLatencyDataBuffer type. Elements conforming to the "AggregatedOMQueryLatencyDataBuffer" type conform to the following schema:

```
<xs:complexType name="AggregatedOMQueryLatencyDataBuffer"
  xmlns:xs="http://www.w3.org/2001/XMLSchema">
    <xs:complexContent mixed="false">
      <xs:extension base="tns:DataBuffer"
        <xs:sequence>
          <xs:element minOccurs="0"
            name="NumQueries" type="xs:int"/>
          <xs:element minOccurs="0"
            name="QPTimeMs" type="xs:int"/>
          <xs:element minOccurs="0"
            name="TotalQueryTimeMs" type="xs:int"/>
        </xs:sequence>
      </xs:extension>
    </xs:complexContent>
</xs:complexType>
```

The "AggregatedOMQueryLatencyDataBuffer" type extends the "DataBuffer" type described elsewhere in this document. Elements conforming to the "AggregatedOMQueryLatencyDataBuffer" type further include a "NumQueries" element, a "QPTimeMs" element, and a "TotalQueryTimeMs" element. The "NumQueries" element indicates a number of search queries from the front end component 206 processed within the given time period on the search component 204. The "QPTimeMs" element specifies a total time in milliseconds reported by the search component 204 for intermediate processing of all the search queries in the given time period. To calculate the time specified by the "QPTimeMs" element, the front end component 206 sums the time reported by the search component 204 in the "QueryProcessingTime" element in the execute responses received from the search component 204. The "TotalQueryTimeMs" element specifies a total time in milliseconds reported by the search component 204 for processing of all search queries in the given time period. To calculate the value of the "TotalQueryTimeMs" element, the front end component 206 sums up the time reported by the search component 204 in the "ElapsedTime" elements of execute responses received in the given time period.

The "VerboseQueryTimings" element of the "OMQueryLatencyDataBuffer" element belongs to the "ArrayOfVerboseOMQueryLatencyDataBuffer" type. Elements belonging to the "ArrayOfVerboseOMQueryLatencyDataBuffer" type conform to the following schema:

```
<xs:complexType name="ArrayOfVerboseOMQueryLatencyDataBuffer"
xmlns:xs="http://www.w3.org/2001/XMLSchema">
    <xs:sequence>
        <xs:element minOccurs="0" maxOccurs="unbounded"
name="VerboseOMQueryLatencyDataBuffer" nillable="true"
type="tns:VerboseOMQueryLatencyDataBuffer"/>
    </xs:sequence>
</xs:complexType>
```

Elements belonging to the "ArrayOfVerboseOMQueryLatencyDataBuffer" type include a list of "VerboseOMQueryLatencyDataBuffer" elements. Each of the "VerboseOMQueryLatencyDataBuffer" elements contains details of search query latency for a single search query. The "VerboseOMQueryLatencyDataBuffer" elements conform to the following schema:

```
<xs:complexType name="VerboseOMQueryLatencyDataBuffer"
xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="CorrelationId"
type="ser:guid"/>
                <xs:element minOccurs="0" name="QPMachine"
nillable="true"
type="xs:string"/>
                <xs:element minOccurs="0" name="QPTimeMs"
type="xs:int"/>
                <xs:element minOccurs="0" name="QueryTerms"
nillable="true"
type="xs:string"/>
                <xs:element minOccurs="0" name="TotalQueryTimeMs"
type="xs:int"/>
            </xs:sequence>
        </xs:extension>
    </xs:complexContent>
</xs:complexType>
```

The "VerboseOMQueryLatencyDataBuffer" type extends the "DataBuffer" type discussed elsewhere in this document. Elements conforming to the "VerboseOMQueryLatencyDataBuffer" type further include a "CorrelationId" element, a "QPMachine" element, a "QPTimeMs" element, a "QueryTerms" element, and a "TotalQueryTimeMs" element. The "CorrelationId" element specifies the unique identifier specified for a search query in the "CorrelationId" element of the execute request for the search query. The "QPMachine" element specifies a name of a computer that processed the search query at the search component 204. The "QPMachine" element specifies the same computer specified by the "QueryMachine" element of the execute response for the search query. The "QPTimeMs" element specifies a time in milliseconds taken by intermediate processing of a search query on the search component 204. The value of "QPTimeMs" element is the same as the value of the "QueryProcessingTime" element in the execute response for the search query. The "QueryTerms" element indicates the query terms for the search query. The "QueryTerms" element specifies the same value as the "QueryTerms" element of the execute response for the search query. The "TotalQueryTimeMs" element specifies a time in milliseconds for processing the search query on the search component 204. The value of the "TotalQueryTimeMs" element is the same as the value of the "ElapsedTime" element in the execute response for the search query.

When the search component 204 invokes the record OM query done event method in response to receiving a record OM latency request, the web API 212 generates a record OM latency response. The record OM latency response is a web services response that is responsive to the record OM latency request. The record OM latency response specifies whether verbose query monitoring is turned on for the search application 216.

In various embodiments, the record OM latency response is formatted in various ways. For example, in some embodiments, the record OM latency response is formatted as a SOAP response comprising XML elements. The XML elements conform to the following schema:

```
<xs:element name="RecordOMQueryDoneEventResponse"
xmlns:xs="http://www.w3.org/2001/XMLSchema">
    <xs:complexType>
        <xs:sequence>
            <xs:element minOccurs="0"
name="RecordOMQueryDoneEventResult"
type="xs:boolean"/>
        </xs:sequence>
    </xs:complexType>
</xs:element>
```

In this example, the "RecordOMQueryDoneEventResponse" represents the record OM latency response. The "RecordOMQueryDoneEventResponse" contains a "RecordOMQueryDoneEventResult" element that specifies whether verbose query monitoring is turned on for the search application 216.

Web Part Latency

The web API 212 also includes a web part query done event method. The search component 204 invokes the web part query done event method when the search component 204 receives a web part latency request. The web part latency request is a web services request to invoke the record web part query done event method. The front end component 206 uses the web part latency request to inform the search component 204 about search query latencies of web parts in the search results page during a given time period. The search query latency of a web part is an amount of time consumed by a web part to process a search query. A web part processes a search query by preparing an execute request for the search query and/or in generating user interface data based on query results for the search query. In various embodiments, the given time period can be various lengths of time. For example, in some embodiments, the given time period is sixty seconds. In other embodiments, the given time period is ninety seconds.

In various embodiments, the web part latency request is formatted in various ways. For example, in some embodiments, the web part latency request is formatted as a SOAP request comprising XML elements. The XML elements conform to the following schema:

```
<xs:element name="RecordWebPartQueryDoneEvent"
xmlns:xs="http://www.w3.org/2001/XMLSchema">
    <xs:complexType>
        <xs:sequence>
            <xs:element minOccurs="0" name="buffer" nillable="true"
xmlns:q19="http://www.microsoft.com/sharepoint/search/KnownTypes/
2008/08"type="q19:WebPartQueryLatencyDataBuffer"/>
```

In this example, the "RecordWebPartQueryDoneEvent" element represents the web part latency request. The "RecordWebPartQueryDoneEvent" element contains a "buffer" element. The "buffer" element contains verbose search query latency of web parts in the search results pages. The "buffer" element belongs to the "WebPartQueryLatencyDataBuffer" type. Elements belonging to the "WebPartQueryLatencyDataBuffer" type conform to the following schema:

```
<xs:complexType name="WebPartQueryLatencyDataBuffer"
  xmlns:xs="http://www.w3.org/2001/XMLSchema">
    <xs:complexContent mixed="false">
        <xs:extension base="tns:DataBuffer">
            <xs:sequence>
                <xs:element minOccurs="0" name=
"VerboseQueryTimings"
nillable="true" type=
"tns:ArrayOfVerboseWebPartQueryLatencyDataBuffer"/>
            </xs:sequence>
        </xs:extension>
    </xs:complexContent>
</xs:complexType>
```

In this example, the "WebPartQueryLatencyDataBuffer" type extends the "DataBuffer" type described elsewhere in this document. In addition, the "WebPartQueryLatencyDataBuffer" type includes a "VerboseQueryTimings" element. The "VerboseQueryTimings" element specifies details of the search query latency for each individual web part in the query results pages. The "VerboseQueryTimings" element belongs to the "ArrayOfVerboseWebPartQueryLatencyDataBuffer" type. Elements belonging to the "ArrayOfVerboseWebPartQueryLatencyDataBuffer" type conform to the following schema:

```
<xs:complexType name=
"ArrayOfVerboseWebPartQueryLatencyDataBuffer"
  xmlns:xs="http://www.w3.org/2001/XMLSchema">
    <xs:sequence>
        <xs:element minOccurs="0" maxOccurs="unbounded"
name="VerboseWebPartQueryLatencyDataBuffer" nillable="true"
type="tns:VerboseWebPartQueryLatencyDataBuffer"/>
    </xs:sequence>
</xs:complexType>
```

In this example, elements belonging to the "ArrayOfVerboseWebPartQueryLatencyDataBuffer" type include a sequence of "VerboseWebPartQueryLatencyDataBuffer" elements. Each of the "VerboseWebPartQueryLatencyDataBuffer" elements specifies a search query latency of a single web part in the search results pages. The "VerboseWebPartQueryLatencyDataBuffer" elements belong to the "VerboseWebPartQueryLatencyDataBuffer" type. Elements belonging to the "VerboseWebPartQueryLatencyDataBuffer" type conform to the following schema:

```
<xs:complexType name="VerboseWebPartQueryLatencyDataBuffer"
  xmlns:xs="http://www.w3.org/2001/XMLSchema">
    <xs:complexContent mixed="false">
        <xs:extension base="tns:DataBuffer">
            <xs:sequence>
                <xs:element minOccurs="0" name="CorrelationId" type="ser:guid"/>
                <xs:element minOccurs="0" name="ExclusiveWebpartTimeMs" type="xs:int"/>
                <xs:element minOccurs="0" name="InclusiveWebpartTimeMs" type="xs:int"/>
                <xs:element minOccurs="0" name="WebPartId" type="ser:guid"/>
                <xs:element minOccurs="0" name="WebPartTitle" nillable="true" type="xs:string"/>
            </xs:sequence>
        </xs:extension>
    </xs:complexContent>
</xs:complexType>
```

In this example, the "VerboseWebPartQueryLatencyDataBuffer" type extends the "DataBuffer" type described elsewhere in this document. In addition, elements belonging to the "VerboseWebPartQueryLatencyDataBuffer" type include a "CorrelationId" element, an "ExclusiveWebPartTimeMs" element, an "InclusiveWebpartTimeMs" element, a "WebPartId" element, and a "WebPartTitle" element. The "CorrelationId" element specifies a unique identifier that the front end component 206 specified for a search query in the "CorrelationId" element of the execute request for the search query. The "ExclusiveWebPartTimeMs" element specifies a time in milliseconds for a web part having a web part identifier specified by the "WebPartId" element to process the search query. The "InclusiveWebpartTimeMs" element specifies a total time in milliseconds for all search-related web parts on the search results page to process the search query. The "WebPartId" specifies a unique identifier of the web part that processed the search query. The "WebPartTitle" is a title of the web part that processed the search query.

When the search component 204 invokes the record web part latency method in response to receiving a record web part latency request, the web API 212 generates a record web part latency response. The record web part latency response is a web services response that is responsive to the record web part latency request. The record web part latency response specifies whether verbose query monitoring is turned on for the search application 216.

In various embodiments, the record web part latency response is formatted in various ways. For example, in some embodiments, the record web part latency response is formatted as a SOAP response comprising XML elements. The XML elements conform to the following schema:

```
<xs:element name="RecordWebPartQueryDoneEventResponse"
xmlns:xs="http://www.w3.org/2001/XMLSchema">
    <xs:complexType>
        <xs:sequence>
            <xs:element minOccurs="0"
            name="RecordWebPartQueryDoneEventResult"
type="xs:boolean"/>
        </xs:sequence>
    </xs:complexType>
</xs:element>
```

In this example, the "RecordWebPartQueryDoneEvent-Response" element represents the record web part latency response. The "RecordWebPartQueryDoneEventResponse" element includes a "RecordWebPartQueryDoneEventResult" element. The "RecordWebPartQueryDoneEventResult" element specifies whether verbose query monitoring is turned on for the search application 216.

Record Click

The web API 212 also includes a record click method. The search component 204 invokes the record click method when the search component 204 receives a record click request. The record click request is a web services request to invoke the record click method. The front end component 206 uses the record click request to inform the search component 204 that a clickthrough has occurred on a given query result or that the user has navigated away from the search results page. The record click request includes information describing the clickthrough.

In various embodiments, the record click request is formatted in various ways. For example, in some embodiments, the record click request is formatted as a SOAP request comprising XML elements. The XML elements conform to the following schema:

```
<xs:element name="RecordClick" xmlns:xs="http://www.w3.org/2001/
XMLSchema">
    <xs:complexType>
        <xs:sequence>
            <xs:element minOccurs="0" name="Info" nillable="true"
xmlns:q16="http://www.microsoft.com/sharepoint/search/KnownTypes/
2008/08" type="q16:QueryInfo"/>
        </xs:sequence>
    </xs:complexType>
</xs:element>
```

In this example, the "RecordClick" element represents the record click request. The "RecordClick" element contains an "Info" element that contains details about the clickthrough and a corresponding search query. The "Info" element belongs to a "QueryInfo" type. Elements belonging to the "QueryInfo" type conform to the following schema:

```
<xs:complexType name="QueryInfo"
xmlns:xs="http://www.w3.org/2001/XMLSchema">
    <xs:sequence>
        <xs:element minOccurs="0" name="AdvancedSearch" type="xs:boolean"/>
        <xs:element minOccurs="0" name="BestBetClicked" nillable="true"
type="xs:string"/>
        <xs:element minOccurs="0" name="ClickTime" type="xs:dateTime"/>
        <xs:element minOccurs="0" name="ClickedUrl" nillable="true"
type="xs:string"/>
        <xs:element minOccurs="0" name="ClickedUrlRank" type="xs:int"/>
        <xs:element minOccurs="0" name="ContextualScope" nillable="true"
type="xs:string"/>
        <xs:element minOccurs="0" name="ContextualScopeUrl" nillable="true"
type="xs:string"/>
        <xs:element minOccurs="0" name="ContinuedSession" type="xs:boolean"/>
        <xs:element minOccurs="0" name="Definitions" type="xs:boolean"/>
        <xs:element minOccurs="0" name="DidYouMean" nillable="true"
type="xs:string"/>
        <xs:element minOccurs="0" name="DidYouMeanReturned" type="xs:boolean"/>
        <xs:element minOccurs="0" name="Digest" nillable="true"
type="xs:string"/>
        <xs:element minOccurs="0" name="DoWAQueryLogging" type="xs:boolean"/>
        <xs:element minOccurs="0" name="ItemsPerPage" type="xs:int"/>
        <xs:element minOccurs="0" name="Location" nillable="true"
type="xs:string"/>
        <xs:element minOccurs="0" name="NonClickedUrls" nillable="true"
xmlns:q25="http://schemas.microsoft.com/2003/10/Serialization/Arrays"
type="q25:ArrayOfstring"/>
        <xs:element minOccurs="0" name="NumBestBets" type="xs:int"/>
        <xs:element minOccurs="0" name="NumHighConfidenceResults"
type="xs:int"/>
        <xs:element minOccurs="0" name="NumResults" type="xs:long"/>
        <xs:element minOccurs="0" name="QueryCulture" nillable="true"
type="xs:string"/>
        <xs:element minOccurs="0" name="QueryGuid" nillable="true"
type="xs:string"/>
        <xs:element minOccurs="0" name="QueryServer" nillable="true"
type="xs:string"/>
        <xs:element minOccurs="0" name="QueryString" nillable="true"
type="xs:string"/>
        <xs:element minOccurs="0" name="ReferrerUrl" nillable="true"
type="xs:string"/>
        <xs:element minOccurs="0" name="ResultView" type="xs:short"/>
        <xs:element minOccurs="0" name="ResultsUrl" nillable="true"
type="xs:string"/>
        <xs:element minOccurs="0" name="Scopes" nillable="true"
```

```
xmlns:q26="http://schemas.microsoft.com/2003/10/Serialization/Arrays"
type="q26:ArrayOfstring"/>
        <xs:element minOccurs="0" name="SearchTime" type="xs:dateTime"/>
        <xs:element minOccurs="0" name="SessionId" nillable="true"
type="xs:string"/>
        <xs:element minOccurs="0" name="SiteGuid" nillable="true"
type="xs:string"/>
        <xs:element minOccurs="0" name="TenantId" nillable="true"
type="xs:string"/>
            <xs:element minOccurs="0" name="Title" nillable="true"
type="xs:string"/>
            <xs:element minOccurs="0" name="UserName" nillable="true"
type="xs:string"/>
    </xs:sequence>
</xs:complexType>
```

In this example, the "QueryInfo" element can contain an "AdvancedSearch" element, a "BestBetClicked" element, a "ClickTime" element, a "ClickedUrl" element, a "ClickedUrlRank" element, a "ContextualScope" element, a "ContextualScopeUrl" element, a "ContinuedSession" element, a "Definitions" element, a "DidYouMean" element, a "DidYouMeanReturned" element, a "Digest" element, a "DoWAQueryLogging element, an "ItemsPerPage" element, a "Location" element, a "NonClickedUrls" element, a "NumBestBets" element, a "NumHighConfidenceResults" element, a "NumResults" element, a "QueryCulture" element, a "QueryGuid" element, a "QueryServer" element, a "QueryString" element, a "ReferrerUrl" element, a "ResultView" element, a "ResultsUrl" element, a "Scopes" element, a "SearchTime" element, a "SessionId" element, a "SiteGuid" element, a "TenantId" element, a "Title" element, and a "UserName" element. The "AdvancedSearch" element specifies whether the search query was issued as an advanced search query. An advanced search query is a search query that conforms to the Advanced Query Syntax promulgated by MICROSOFT® Corporation. The "BestBetClicked" element specifies whether a best bet result was clicked. The "ClickTime" element specifies a date and a time at which the URI specified in the "ClickedUrl" element was clicked. The "ClickedUrl" element specifies the URI of the query result that was clicked. The "ClickedUrlRank" element specifies the position of the query result that was clicked among all query results. The "ContextualScope" element specifies a contextual search scope under which the search query was executed. A contextual search scope is a system-defined restriction added to a search query to restrict the query results to content items that are from a specific site or list. The "ContinuedSession" element specifies whether the "Info" element is the first entry for the search query in a search query log. A search query log is a record of information about user searches, such as search terms and times of access. The "Definitions" element specifies whether an extracted definition result is clicked. The "DidYouMean" element specifies spelling suggestions. The "DidYouMeanReturned" element specifies whether a spelling suggestion was returned for the search query. The "Digest" element is unused. The "DoWAQueryLogging" element specifies whether the search application 216 is to store information regarding the clickthrough and the search query for future web analysis use. The "ItemsPerPage" element specifies a number of query results returned for the search query. The "Location" element specifies a name of a federated location which the search query was executed against. A federated location is a source that returns query results for a search query (e.g., the data source component 202). The "NonClickedUrls" element specifies a collection of URIs that the search query returned, but that were not clicked. The "NumBestBets" element specifies the number of best bet results returned for the search query. The "NumHighConfidenceResults" element specifies a number of high confidence results returned for a search query. The "NumResults" element specifies the number of results returned for the search query. The "QueryCulture" element specifies a language/culture of the search query. The "QueryGuid" element specifies a unique identifier of a web part that issued the search query. The "QueryServer" element specifies a name of a server in which the search query was executed. The "QueryString" element specifies the query text of a search query. The "ReferrerUrl" element specifies a URI of a page that contains a URI of a page where the clickthrough occurred. The "ResultView" element specifies a results sort view of the query results. The "ResultsUrl" element specifies the URI of the page where the clickthrough occurred. The "Scopes" element specifies a search scope under which the search query was executed. The "SessionId" element specifies a unique identifier of a search session of a specific user in which the search query was sent. The "SiteGuid" element specifies a unique identifier of a site collection from which the search query was executed. The "TenantId" element specifies a unique identifier of a tenant executing the search query. A tenant is a protocol client or protocol server that consumes a partition in a shared service database (e.g., the database 210). The "Title" element specifies a title of a query result that was clicked. The "UserName" element specifies a name of a user who issued the search query.

When the search component 204 invokes the record click method in response to receiving a record click request, the web API 212 generates a record click response. The record click response is a web services response that is responsive to the record click request. The record click response acknowledges the record click request. In various embodiments, the record click response is formatted in various ways. For example, in some embodiments, the record click response is formatted as a SOAP response comprising XML elements. The XML elements conform to the following schema:

```
<xs:element name="RecordClickResponse"
    xmlns:xs="http://www.w3.org/2001/XMLSchema">
    <xs:complexType>
        <xs:sequence/>
    </xs:complexType>
</xs:element>
```

In this example, the "RecordClickResponse" element represents the record click response.

Query Suggestions

The web API 212 also includes a query suggestions method. The search component 204 invokes the query suggestions method when the search component 204 receives a query suggestions request. The query suggestions request is a web services request to invoke the query suggestions method. The front end component 206 uses the query suggestions request to retrieve a list of query suggestions that match a search query.

In various embodiments, the query suggestion request specifies various pieces of data. For example, in some embodiments, the query suggestion request specifies a set of query properties that describe the search query. Furthermore, in some embodiments, the query suggestion request further specifies a number of query suggestions to retrieve. Furthermore, in some embodiments, the query suggestion request further specifies whether to retrieve pre-query suggestions or post-query suggestions. A pre-query suggestion is a search query that is related to a search query that a user is typing into a search box. A pre-query suggestion is provided prior to execution of the search query. A post-query suggestion is an alternate search query that is related to a search query that was executed. A post-query suggestion is provided after execution of a search query. Furthermore, in some embodiments, the query suggestion request further specifies whether to highlight terms in the pre-query suggestions that correspond to terms in a search query that a user is typing or terms in post-query suggestions that correspond to terms in an executed search query. Furthermore, in some embodiments, the query suggestion request further specifies whether to capitalize the first letters of words in the query suggestions.

In various embodiments, the query suggestion request is formatted in various ways. For example, in some embodiments, the query suggestion request is formatted as a SOAP request comprising XML elements. In some embodiments, the XML elements conform to the following schema:

```
<xs:element name="GetQuerySuggestions"
xmlns:xs="http://www.w3.org/2001/XMLSchema">
    <xs:complexType>
        <xs:sequence>
            <xs:element minOccurs="0"
            name="properties" nillable="true"
xmlns:q10=
"http://www.microsoft.com/sharepoint/search/KnownTypes/2008/08"
type="q10:QueryProperties"/>
            <xs:element minOccurs="0"
            name="iNumberOfSuggestions" type="xs:int"/>
            <xs:element minOccurs="0" name=
            "fPreQuerySuggestions"
type="xs:boolean"/>
            <xs:element minOccurs="0" name=
            "fHitHighlighting" type="xs:boolean"/>
            <xs:element minOccurs="0"
            name="fCapitalizeFirstLetters"
type="xs:boolean"/>
        </xs:sequence>
    </xs:complexType>
</xs:element>
```

In this example, the "GetQuerySuggestions" element represents the query suggestion request. The "GetQuerySuggestions" element contains a "properties" element. The "properties" element specifies the set of query properties that describe the search query. The "iNumberOfSuggestions" element specifies the number of query suggestions to retrieve. The "fPreQuerySuggestions" element specifies whether to retrieve pre-query suggestions or post-query suggestions. The "fHitHighlighting" element specifies whether to highlight terms in the query suggestions. The "fCapitalizeFirstLetters" element specifies whether to capitalize the first letters of words in the query suggestions.

When the search component 204 invokes the query suggestions method in response to receiving a query suggestions request, the web API 212 generates a query suggestion response. The query suggestion response is a web services response that is responsive to the query suggestion request. The query suggestion response specifies a collection of query suggestions for the search query.

In various embodiments, the query suggestion response is formatted in various ways. For example, in some embodiments, the query suggestion response is formatted as a SOAP response comprising XML elements. In some embodiments, the XML elements conform to the following schema:

```
<xs:element name="GetQuerySuggestionsResponse"
xmlns:xs="http://www.w3.org/2001/XMLSchema">
    <xs:complexType>
        <xs:sequence>
            <xs:element minOccurs="0"
            name="GetQuerySuggestionsResult"
nillable="true"
xmlns:q11="http://schemas.microsoft.com/2003/10/Serialization/Arrays"
type="q11:ArrayOfanyType"/>
        </xs:sequence>
    </xs:complexType>
</xs:element>
```

In this example, the "GetQuerySuggestionResponse" element contains a sequence of "GetQuerySuggestionsResult" elements. Each of the "GetQuerySuggestionsResult" elements specifies a query suggestion for the search query.

Get Click Frequencies

The web API 212 also includes a get click frequencies method. The search component 204 invokes the get click frequencies method when the search component 204 receives a get click frequencies request. The get click frequencies request is a web services request to invoke the get click frequencies method. The front end component 206 uses the get click frequencies request to obtain click frequencies for a given URI for a given time period following a given reference date. In various embodiments, the front end component 206 is able to use the get click frequencies request to obtain click frequencies for the given URI for time periods of various lengths. For example, the front end component 206 can use the get click frequencies request to obtain click frequencies for the given URI for the past week or month after the given reference date (e.g., Dec. 23, 2009).

In various embodiments, the get click frequencies request is formatted in various ways. For example, in some embodiments, the get click frequencies request is formatted as a SOAP request comprising XML elements. The XML elements conform to the following schema:

```
<xs:element name="GetClickFrequenciesForUrl"
xmlns:xs="http://www.w3.org/2001/XMLSchema">
    <xs:complexType>
        <xs:sequence>
            <xs:element minOccurs="0" name="url" nillable="true"
type="xs:string"/>
            <xs:element minOccurs="0"
```

```
             name="referenceDate" type="xs:dateTime"/>
        </xs:sequence>
    </xs:complexType>
</xs:element>
```

In this example, the "GetClickFrequenciesForUrl" element represents the get click frequencies request. The "GetClickFrequenciesForUrl" element contains a "url" element and a "referenceDate" element. The "url" element specifies a URI for which the click frequencies are to be returned. The "referenceDate" elements specifies a date from which the click frequencies are calculated.

When the search component 204 invokes the get click frequencies method in response to receiving a get click frequencies request, the web API 212 generates a get click frequencies response. The get click frequencies response is a web services response that is responsive to the get click frequencies request. The get click frequencies response contains click frequencies for the URI specified in the get click frequencies request.

In various embodiments, the get click frequencies response is formatted in various ways. For example, in some embodiments, the get click frequencies response is formatted as a SOAP response comprising XML elements. The XML elements conform to the following XML schema:

```
<xs:element name="GetClickFrequenciesForUrlResponse"
xmlns:xs="http://www.w3.org/2001/XMLSchema">
    <xs:complexType>
        <xs:sequence>
            <xs:element minOccurs="0"
            name="GetClickFrequenciesForUrlResult"
nillable="true"
xmlns:q14="http://schemas.microsoft.com/2003/10/Serialization/Arrays"
type="q14:ArrayOfint"/>
        </xs:sequence>
    </xs:complexType>
</xs:element>
```

In this example, the "GetClickFrequenciesForUrlResponse" element represents the get click frequencies response. The "GetClickFrequenciesForUrlResponse" element includes a "GetClickFrequenciesForUrlResult" element. The "GetClickFrequenciesForUrlResult" element specifies the click frequencies for the URI specified in the get click frequencies request for the given time period after the reference data specified in the get click frequencies request.

Get Search Terms

The web API 212 also includes a get search terms method. The search component 204 invokes the get search terms method when the search component 204 receives a get search terms request. The get search terms request is a web services request to invoke the get search terms method. The front end component 206 uses the get search terms request to retrieve a text restriction of a keyword query as interpreted by the search application 216. A keyword query is a search query expressed as a set of keywords.

In various embodiments, the get search terms request is formatted in various ways. For example, in some embodiments, the get search terms request is formatted as a SOAP request comprising XML elements. The XML elements conform to the following schema:

```
<xs:element name="GetSearchTerms"
xmlns:xs="http://www.w3.org/2001/XMLSchema">
    <xs:complexType>
        <xs:sequence>
            <xs:element minOccurs="0"
            name="properties" nillable="true"
xmlns:q1="http://www.microsoft.com/sharepoint/search/KnownTypes/
2008/08" type="q1:KeywordQueryProperties"/>
        </xs:sequence>
    </xs:complexType>
</xs:element>
```

In this example, the "GetSearchTerms" element represents the get search terms request. The "GetSearchTerms" element contains a "properties" element. The "properties" element specifies properties related to the search query. The "properties" element belongs to the "KeywordQueryProperties" type. The "KeywordQueryProperties" type is discussed elsewhere in this document.

When the search component 204 invokes the get search terms method in response to receiving a get search terms request, the web API 212 generates a get search terms response. The get search terms response is a web services response that is responsive to the get search terms request. The get search terms response contains a text restriction of the query text of the search query specified by the get search terms request.

In various embodiments, the get search terms response is formatted in various ways. For example, in some embodiments, the get search terms response is formatted as a SOAP response comprising XML elements. The XML elements conform to the following schema:

```
<xs:element name="GetSearchTermsResponse"
xmlns:xs="http://www.w3.org/2001/XMLSchema">
    <xs:complexType>
        <xs:sequence>
            <xs:element minOccurs="0"
            name="GetSearchTermsResult" nillable="true"
type="xs:string"/>
        </xs:sequence>
    </xs:complexType>
</xs:element>
```

In this example, the "GetSearchTermsResponse" element represents the get search terms response. The "GetSearchTermsResponse" element contains a "GetSearchTermsResult" element. The "GetSearchTermsResponse" element specifies a text restriction on the "QueryText" element of the "properties" element in the corresponding get search terms request.

FIG. 3 is a flowchart illustrating an example operation 300 of the front end component 206 to execute a search query and to provide performance information to the search component 204. In some embodiments, the front end component 206 performs the operation 300 to process a search query. In other embodiments, the front end component 206 performs other operations to process a search query. Such other operations can include more or fewer steps than the operation 300. Furthermore, such other operations can include the steps of the operation 300 in a different sequence. Furthermore, the front end component 206 can use the methods of the web API 212 to perform many operations aside from the operation 300.

As illustrated in the example of FIG. 3, the operation 300 starts when the front end component 206 receives a search request from the client computing system 102 (302). The search request specifies one or more search queries. In the example of FIG. 3, the front end component 206 receives the search request via a web part in a web page in a website.

The front end component 206 sends a get scopes request to the search component 204 (304). The get scopes request includes data that identifies a search scope consumer. The search scope consumer is the web site through which the search request was received. After the front end component 206 sends the get scopes request, the front end component 206 receives a get scopes response (306). The get scopes response contains information about search scopes that are available to the search component 204 for the search scope consumer.

Next, the front end component 206 sends a query suggestions request to the search component 204 (308). The front end component 206 uses the query suggestions request to retrieve a list of query suggestions that match the search query. After sending the query suggestion request, the front end component 206 receives a query suggestion response (310). The query suggestion response specifies a collection of query suggestions for the search query. The front end component 206 then provides the query suggestions to the client computing system 102. The client computing system 102 displays the query suggestions to a user of the client computing system 102. The query suggestions can help the user select an appropriate search query.

The front end component 206 then sends an execute request to the search component 204 (312). The front end component 206 uses the execute method to execute the search query. The execute request specifies the search query as a set of properties. The properties of the search query define a query condition. In some instances, the query condition limits the query results to content items within one of the scopes indicated in the get scopes response.

Subsequently, the front end component 206 receives an execute response from the search component 204 (314). The execute response contains data regarding query results for the search query. The query results are content items in the database 210 that satisfy the query condition. In addition to the query results, the execute response specifies an amount of time consumed by the search component 204 to process the execute request.

After receiving the execute response, the front end component 206 generates user interface data (316). The user interface data represents a user interface element having contents that depend on the query results. The user interface element can be all or part of a search results page. In various embodiments, the front end component 206 generates the user interface data in various ways. For example, in some embodiments, the front end component 206 generates a HTML document that represents the user interface. In other example embodiments, the front end component 206 generates XML data that a client computing system uses to modify an existing web page.

The front end component 206 sends a record OM latency request to the search component 204 (318). The front end component 206 uses the record OM latency request to inform the search component 204 about the latencies for processing search queries on the search component 204 within a given time period, as reported by the search component 204 in execute responses received from the search component 204. After the front end component 206 sends the record OM latency request, the front end component 206 receives a record object model latency response (320). The record object model latency response specifies whether verbose query monitoring is turned on for the search application 216.

In addition, the front end component 206 sends a record interface latency request to the search component 204 (322). The front end component 206 uses the record interface latency request to inform the search component 204 about the search query latency for search queries received by the front end component 206 within a given time period. After sending the record interface latency request, the front end component 206 receives a record interface latency response from the search component 204 (324). The record interface latency response specifies whether verbose query monitoring is turned on for the search application 216.

Furthermore, the front end component 206 sends a record click request to the search component 204 (326). The front end component 206 uses the record click request to inform the search component 204 that a clickthrough has happened or that the user has navigated away from the user interface. Subsequently, the front end component 206 receives a record click response from the web API 212 (328). The record click response acknowledges the record click request.

Figure 4:
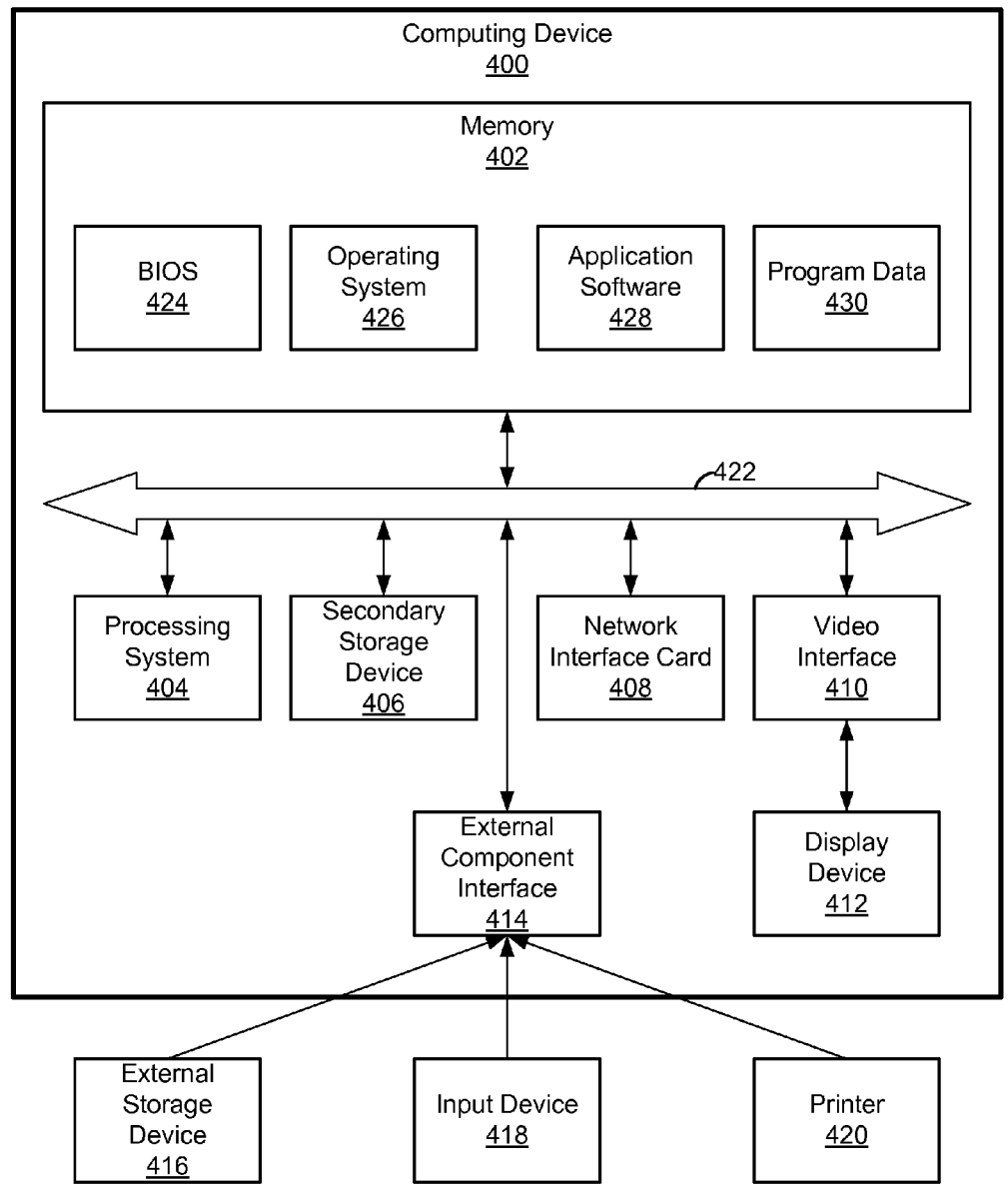
FIG. 4 is a block diagram illustrating an example computing device usable in the system.

FIG. 4 is a block diagram illustrating an example computing device 400 usable in the system 100. In some embodiments, the client computing system 102 and the computing devices 106 are implemented using one or more computing devices like the computing device 400. It should be appreciated that in other embodiments, the client computing system 102 and the computing devices 106 are implemented using computing devices having hardware components other than those illustrated in the example of FIG. 4.

In different embodiments, computing devices are implemented in different ways. For instance, in the example of FIG. 4, the computing device 400 comprises a memory 402, a processing system 404, a secondary storage device 406, a network interface card 408, a video interface 410, a display device 412, an external component interface 414, an external storage device 416, an input device 418, a printer 420, and a communication medium 422. In other embodiments, computing devices are implemented using more or fewer hardware components. For instance, in another example embodiment, a computing device does not include a video interface, a display device, an external storage device, or an input device.

The memory 402 includes one or more computer-readable data storage media capable of storing data and/or instructions. In different embodiments, the memory 402 is implemented in different ways. For instance, in various embodiments, the memory 402 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 404 includes one or more physical integrated circuits that selectively execute software instructions. In various embodiments, the processing system 404 is implemented in various ways. For instance, in one example embodiment, the processing system 404 is implemented as one or more processing cores. For instance, in this example embodiment, the processing system 404 may be implemented as one or more Intel Core 2 microprocessors. In another example embodiment, the processing system 404 is implemented as one or more separate microprocessors. In yet another example embodiment, the processing system 404 is implemented as an ASIC that provides specific functionality.

In yet another example embodiment, the processing system 404 provides specific functionality by using an ASIC and by executing software instructions.

In different embodiments, the processing system 404 executes software instructions in different instruction sets. For instance, in various embodiments, the processing system 404 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 406 includes one or more computer-readable data storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 is implemented by various types of computer-readable data storage media. For instance, the secondary storage device 406 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 408 enables the computing device 400 to send data to and receive data from a computer communication network. In different embodiments, the network interface card 408 is implemented in different ways. For example, in various embodiments, the network interface card 408 is implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display device 412. In different embodiments, the video interface 410 is implemented in different ways. For instance, in one example embodiment, the video interface 410 is integrated into a motherboard of the computing device 400. In another example embodiment, the video interface 410 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 412 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 410 communicates with the display device 412 in various ways. For instance, in various embodiments, the video interface 410 communicates with the display device 412 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 414 enables the computing device 400 to communicate with external devices. In various embodiments, the external component interface 414 is implemented in different ways. For instance, in one example embodiment, the external component interface 414 is a USB interface. In other example embodiments, the computing device 400 is a FireWire interface, a serial port interface, a parallel port interface, a PS/2 interface, and/or another type of interface that enables the computing device 400 to communicate with external components.

In different embodiments, the external component interface 414 enables the computing device 400 to communicate with different external components. For instance, in the example of FIG. 4, the external component interface 414 enables the computing device 400 to communicate with the external storage device 416, the input device 418, and the printer 420. In other embodiments, the external component interface 414 enables the computing device 400 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 400.

The external storage device 416 is an external component comprising one or more computer readable data storage media. Different implementations of the computing device 400 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 418 is an external component that provides user input to the computing device 400. Different implementations of the computing device 400 interface with different types of input devices. Example types of input devices include, but are not limited to, keyboards, mice, trackballs, stylus input devices, key pads, microphones, joysticks, touch-sensitive display screens, and other types of devices that provide user input to the computing device 400. The printer 420 is an external device that prints data to paper. Different implementations of the computing device 400 interface with different types of printers. Example types of printers include, but are not limited to laser printers, ink jet printers, photo printers, copy machines, fax machines, receipt printers, dot matrix printers, or other types of devices that print data to paper.

The communications medium 422 facilitates communication among the hardware components of the computing device 400. In different embodiments, the communications medium 422 facilitates communication among different components of the computing device 400. For instance, in the example of FIG. 4, the communications medium 422 facilitates communication among the memory 402, the processing system 404, the secondary storage device 406, the network interface card 408, the video interface 410, and the external component interface 414. In different implementations of the computing device 400, the communications medium 422 is implemented in different ways. For instance, in different implementations of the computing device 400, the communications medium 422 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 424, an operating system 426, application software 428, and program data 430. The BIOS 424 includes a set of software instructions that, when executed by the processing system 404, cause the computing device 400 to boot up. The operating system 426 includes a set of software instructions that, when executed by the processing system 404, cause the computing device 400 to provide an operating system that coordinates the activities and sharing of resources of the computing device 400. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 428 includes a set of software instructions that, when executed by the processing system 404, cause the computing device 400 to provide applications to a user of the computing device 400. The program data 430 is data generated and/or used by the application software 428.

The various embodiments described above are provided by way of illustration only and should not be construed as limiting. Those skilled in the art will readily recognize various modifications and changes that may be made without following the example embodiments and applications illustrated and described herein.

We claim:

1. A method of collecting performance information for search queries, the method comprising:
   receiving, by a first component, a search request, the search request specifying a search query, the first component provided by a first computing system;
   after receiving the search request, sending, by the first component, an execute request to a second component, the execute request being a web services request to invoke an execute method of a web Application Programming Interface (API) provided by the second component, the execute request specifying the search query;
   after sending the execute request, receiving, by the first component, an execute response from the second component, the execute response being a web services response that is responsive to the execute request, the execute response comprising latency data and data regarding query results, the latency data specifying an amount of time consumed by the second component to process the execute request, the query results being content items that satisfy the search query;
   after receiving the execute response, generating, by the first component, user interface data, the user interface data representing a user interface element having contents that depend on the query results;
   sending, by the first component, a record object model latency request to the second component, the record object model latency request being a web services request to invoke a record object model latency method of the web API, the record object model latency request specifying search performance information based on the latency data;
   sending, by the first component, a record interface latency request to the second component, the record interface latency request being a web services request to invoke a record interface latency method of the web API, the record interface latency request specifying interface performance information based on an amount of time consumed by the first component to process the search request;
   receiving, by the first component, a record object model latency response from the second component, the record object model latency response being a web services response that is responsive to the record object model latency request, the record object model latency response specifying whether verbose query monitoring is turned on at the second component; and
   receiving, by the first component, a record interface latency response from the second component, the record interface latency response being a web services response that is responsive to the record interface latency request, the record interface latency response specifying whether verbose query monitoring is turned on at the second component,
   wherein, when verbose query monitoring is turned on, the second component stores the following for the search query: a correlation identifier, a name of a computer that processed the execute request, a number of milliseconds consumed by intermediate processing by the second component in processing the execute request, terms in the search query, and a total time in milliseconds consumed by the second component in processing the execute request.

2. The method of claim 1,
   wherein the method further comprises:
      sending, by the first component, a plurality of execute requests to the second component within a given time period; and
      receiving, by the first component, a plurality of execute responses from the second component, each execute response in the plurality of execute responses being responsive to an execute request in the plurality of execute requests; and
   wherein the search performance information is based on latency data in each execute response in the plurality of execute responses.

3. The method of claim 2,
   wherein the method further comprises: receiving, by the first component, a plurality of search requests; and
   wherein the interface performance information specifies amounts of time consumed by the first component to process each search request in the plurality of search requests.

4. The method of claim 1,
   wherein the method further comprises:
      sending, by the first component, a get scopes request to the second component, the get scopes request being a web services request to invoke a get scopes method of the web API; and
      receiving, by the first component, a get scopes response from the second component, the get scopes response being a web services response that is responsive to the get scopes request, the get scopes response specifying a set of available search scopes provided by the second component; and
   wherein the execute request specifies at least one search scope in the set of available search scopes.

5. The method of claim 1, further comprising: sending, by the first component, a record click request to the second component, the record click request being a web services request to invoke a record click method of the web API, the record click request including information describing a click through that has occurred on a given content item, the given content item being one of the query results.

6. The method of claim 1, further comprising:
   sending, by the first component, a query suggestions request to the second component, the query suggestions request being a web services request to invoke a query suggestions method of the web API, the query suggestions request specifying one or more properties describing the search query; and
   receiving, by the first component, a query suggestions response from the second component, the query suggestions response being a web services response that is responsive to the query suggestions request, the query suggestions response specifying a set of one or more query suggestions, each query suggestion in the set of query suggestions being a search query related to the search query.

7. The method of claim 1,
sending, by the first component, a get properties request to the second component, the get properties request being a web services request to invoke a get properties method of the web API; and
receiving, by the first component, a get properties response from the second component, the get properties response being a web services response that is responsive to the get properties request, the get properties response containing information about managed properties of the second component.

8. The method of claim 1, wherein the execute response specifies an amount of time consumed by intermediate processing of the execute request at the second component and an amount of time consumed to execute database operations for retrieving the query results from a database.

9. The method of claim 1,
wherein the first component provides a collection of one or more websites to client computing systems; and
wherein receiving the search request comprises: receiving the search request through a web page in one of the websites.

10. A computing device comprising:
a processing system; and
a data storage system storing software instructions that, when executed by the processing system, cause the computing device to:
receive an execute request from a front end component, the execute request being a web services request to invoke an execute method of a web Application Programming Interface (API) provided by the computing device, the execute request specifying a search query;
after receiving the execute request, send an execute response to the front end component, the execute response being a web services response that is responsive to the execute request, the execute response comprising latency data and one or more properties of query results, the latency data specifying an amount of time consumed by the computing device to process the execute request, the query results being content items that satisfy the search query;
receive a record object model latency request from the front end component, the record object model latency request being a web services request to invoke a record object model latency method of the web API, the record object model latency request specifying search performance information based on the latency data;
receive a record interface latency request from the front end component, the record interface latency request being a web services request to invoke a record interface latency method of the web API, the record interface latency request specifying interface performance information based on an amount of time consumed by the front end component to process a search request that specifies the search query; and
send a record interface latency response to the front end component, the record interface latency response being a web services response that is responsive to the record interface latency request, the record interface latency response specifying whether verbose query monitoring is turned on.

11. The computing device of claim 10, wherein the software instructions, when executed by the processing system, further cause the computing device to:
use an index to identify the query results; and
retrieve the one or more properties of the query results from a data source component provided by another computing device.

12. The computing device of claim 10, wherein the software instructions, when executed by the processing system, further cause the computing device to:
send a record object model latency response to the front end component, the record object model latency response being a web services response that is responsive to the record object model latency request, the record object model latency response specifying whether verbose query monitoring is turned on; and
wherein when verbose query monitoring is turned on, the record interface latency request includes the following for the search query: a correlation identifier, a name of a computer that processed the execute request, a number of milliseconds consumed by intermediate processing by the computing device in processing the execute request, terms in the search query, and a total time in milliseconds consumed by the computing device in processing the execute request.

13. The computing device of claim 10,
wherein the software instructions, when executed by the processing system, cause the computing device to:
receive a plurality of execute requests from the front end component; and
send a plurality of execute responses to the front end component; and
wherein the search performance information is based on latency data in each execute response in the plurality of execute responses received by the front end component in a given time period.

14. The computing device of claim 13, wherein the interface performance information specifies amounts of time consumed by the front end component to process each search request in a plurality of search requests received in the given time period.

15. The computing device of claim 10,
wherein the software instructions, when executed by the processing system, cause the computing device to:
receive a get scopes request from the front end component, the get scopes request being a web services request to invoke a get scopes method of the web API; and
send a get scopes response to the front end component, the get scopes response being a web services response that is responsive to the get scopes request, the get scopes response specifying a set of available search scopes provided by the computing device; and
wherein the execute request specifies at least one search scope in the set of available search scopes.

16. The computing device of claim 10, wherein the software instructions, when executed by the processing system, cause the computing device to receive a record click request from the front end component, the record click request being a web services request to invoke a record click method of the web API, the record click request including information describing a click through that has occurred on one of the query results.

17. The computing device of claim 10, wherein the software instructions, when executed by the processing system, cause the computing device to:

receive a query suggestions request from the front end component, the query suggestions request being a web services request to invoke a query suggestions method of the web API, the query suggestions request specifying one or more properties describing the search query; and send a query suggestions response to the front end component, the query suggestions response being a web services response that is responsive to the query suggestions request, the query suggestions response specifying a set of one or more query suggestions, each query suggestion in the set of query suggestions being a search query related to the search query.

18. The computing device of claim 10, wherein the software instructions, when executed by the processing system, cause the computing device to:

receive a get click frequencies request from the front end component, the get click frequencies request being a web services request to invoke a get click frequencies method of the web API, the get click frequencies request specifying a Uniform Resource Identifier (URI); and send a get click frequencies response to the front end component, the get click frequencies response being a web services response that is responsive to the get click frequencies request, the get click frequencies response containing click frequencies for the URI.

19. A computer-readable data storage medium comprising software instructions that, when executed, cause a computing device to:

provide a collection of one or more websites to client computing systems;

receive a search request through a web page in one of the websites, the search request specifying a search query;

after receiving the search request, send an execute request to a search component provided by another computing device, the execute request being a web services request to invoke an execute method of a web Application Programming Interface (API) provided by the search component, the execute request specifying the search query;

send a query suggestions request to the search component, the query suggestions request being a web services request to invoke a query suggestions method of the web API, the query suggestions request specifying one or more properties describing the search query;

receive a query suggestions response from the search component, the query suggestions response being a web services response that is responsive to the query suggestions request, the query suggestions response specifying a set of one or more query suggestions, each query suggestion in the set of query suggestions being a search query related to the search query;

after sending the execute request, receive an execute response from the search component, the execute response being a web services response that is responsive to the execute request, the execute response comprising latency data and one or more properties of query results, the latency data specifying an amount of time consumed by the search component to process the execute request, an amount of time consumed by intermediate processing of the execute request at the search component and an amount of time consumed to execute database operations for retrieving the query results from a database, wherein the query results are content items that satisfy the search query;

after receiving the execute response, generate a search results page containing at least one of the properties of a given content item, the given content item being one of the query results;

send a record object model latency request to the search component, the record object model latency request being a web services request to invoke a record object model latency method of the web API, the record object model latency request specifying search performance information based on the latency data and based on latency data specified in execute responses for other search requests received within a given time period;

receive a record object model latency response from the search component, the record object model latency response being a web services response that is responsive to the record object model latency request, the record object model latency response specifying whether verbose query monitoring is turned on at the search component;

send a record interface latency request to the search component, the record interface latency request being a web services request to invoke a record interface latency method of the web API, the record interface latency request specifying interface performance information based on amounts of time consumed by the computing device to process the search request and other search requests received in the given time period; and receive a record interface latency response from the search component, the record interface latency response being a web services response that is responsive to the record interface latency request, the record interface latency response specifying whether verbose query monitoring is turned on at the search component.

* * * * *